United States Patent
Tsuyuki et al.

(10) Patent No.: US 6,919,943 B2
(45) Date of Patent: Jul. 19, 2005

(54) SUBSTRATE FOR A LIQUID CRYSTAL DEVICE, METHOD OF MANUFACTURING A SUBSTRATE FOR A LIQUID CRYSTAL DEVICE, A LIQUID CRYSTAL DEVICE, A METHOD OF MANUFACTURING A LIQUID CRYSTAL DEVICE, AND AN ELECTRONIC APPARATUS

(75) Inventors: Tadashi Tsuyuki, Nagano-ken (JP); Mutsumi Matsuo, Misato-mura (JP); Chihiro Tanaka, Matsumoto (JP)

(73) Assignee: Seiko Epson Corporation (JP)

( * ) Notice: Subject to any disclaimer, the term of this patent is extended or adjusted under 35 U.S.C. 154(b) by 185 days.

(21) Appl. No.: 10/032,287

(22) Filed: Dec. 21, 2001

(65) Prior Publication Data

US 2002/0118324 A1 Aug. 29, 2002

(30) Foreign Application Priority Data

Dec. 25, 2000 (JP) ........................... 2000-392828
Nov. 13, 2001 (JP) ........................... 2001-347606

(51) Int. Cl.[7] .......................................... G02F 1/1335
(52) U.S. Cl. ...................................................... 349/113
(58) Field of Search ............................... 349/113, 158, 349/112

(56) References Cited

U.S. PATENT DOCUMENTS

| | | | | |
|---|---|---|---|---|
| 5,418,635 A | * | 5/1995 | Mitsui et al. | 349/113 |
| 6,097,458 A | | 8/2000 | Tsuda et al. | |
| 6,104,460 A | * | 8/2000 | Abe et al. | 349/113 |
| 6,433,847 B1 | * | 8/2002 | Minoura | 349/113 |
| 6,573,959 B1 | * | 6/2003 | Molsen | 349/113 |
| 2002/0005922 A1 | * | 1/2002 | Umemoto et al. | 349/65 |
| 2002/0039155 A1 | * | 4/2002 | Umemoto | 349/61 |
| 2002/0122144 A1 | * | 9/2002 | Yoshida et al. | 349/61 |

FOREIGN PATENT DOCUMENTS

| | | | | |
|---|---|---|---|---|
| JP | 58-002821 | | 7/1981 | |
| JP | 59-15279 | | 7/1982 | |
| JP | 60-16178 | | 7/1983 | |
| JP | 06102507 | * | 4/1994 | ......... G02F/1/1335 |
| JP | 10020290 | * | 1/1998 | ......... G02F/1/1333 |
| JP | 10-177106 | | 6/1998 | |
| JP | 2000-009910 | | 1/2000 | |
| JP | 2000-105366 | | 4/2000 | |
| JP | 2000-111903 | | 4/2000 | |
| JP | 2000321998 | * | 11/2000 | ............. G09F/9/00 |
| JP | 2001-141915 | | 5/2001 | |

OTHER PUBLICATIONS

Communication from Chinese Patent Office regarding counterpart application.
Korean Examination Report.

* cited by examiner

Primary Examiner—Robert H. Kim
Assistant Examiner—Jeanne Andrea Di Grazio
(74) Attorney, Agent, or Firm—Harness, Dickey & Pierce, P.L.C.

(57) ABSTRACT

In a pair of substrates which sandwich a liquid crystal therebetween, a substrate 2a for a liquid crystal device that is positioned opposite from the viewing side. A pixel electrode 9 is formed on the surface of a base 6a as a light reflecting film. A pattern in which a plurality of convexities 10c are arranged is formed on the surface of the light reflecting film 9. These convexities 10c are formed into rectangular dome shapes such that the spatial shape thereof that extends along one axis of the two orthogonal X, Y axes that pass through said convexities themselves is different from the spatial shape thereof along the other axis. The light reflecting film 9 achieves both light directivity and light scattering.

22 Claims, 32 Drawing Sheets

(a)

(b)

(a)

(b)

(a)

(b)

SUBSTRATE FOR A LIQUID CRYSTAL DEVICE, METHOD OF MANUFACTURING A SUBSTRATE FOR A LIQUID CRYSTAL DEVICE, A LIQUID CRYSTAL DEVICE, A METHOD OF MANUFACTURING A LIQUID CRYSTAL DEVICE, AND AN ELECTRONIC APPARATUS

BACKGROUND OF THE INVENTION

1. Field of Industrial Use

The present invention relates to a substrate for a liquid crystal device that is an element of a liquid crystal device, and a method of manufacturing the same. The present invention also relates to a liquid crystal device that is constructed of and employs a substrate for a liquid crystal device, and a method of manufacturing the same. The present invention further relates to an electronic apparatus that is constructed of and employs a liquid crystal device.

2. Prior Art

In recent years liquid crystal devices have begun to be widely used in electronic equipment such as cellular telephones and portable personal computers. One well-known liquid crystal device is capable of reflection display. In this liquid crystal device, display takes place by taking in external light such as natural light and interior light into the interior of the liquid crystal device, and reflecting this light off of a light reflecting film provided on the interior of the display device to the exterior of the device.

According to this construction, power consumption can be lowered and controlled due to the fact that display can occur without the use of a backlight, i.e., a lighting device. In addition, thinness and lightness can be achieved when a backlight is not attached.

In liquid crystal devices that are capable of reflection display, when the surface of the reflection film is mirror-like, background and interior light are projected with the image visible to the viewer, and thus the image that is displayed becomes difficult to see. In the past, a well-known technique to solve this problem involved forming a plurality of minute convexities on the surface of the aforementioned reflection film and then roughening it, which scattered the reflected light to a sufficient degree.

The reflected light caused by the roughness of the reflection surface on the aforementioned conventional substrate for liquid crystal devices is set such that it is uniform over the entire area. For example, as shown in FIG. 17, if a light beam $R_0$ is irradiated onto a substrate for a liquid crystal device 91 normal therewith and travels to a detector (for example, a photomultimeter 92) in every direction along an X axis and Y axis that are orthogonal to each other, as shown in FIG. 18, when the amount of reflected light $R_1$ is measured at that point, the profiles of reflected light $Q_X$ along the X axis between −90 degrees and +90 degrees, and the reflected light $Q_Y$ along the Y axis between −90 degrees and +90 degrees, are the same.

In a liquid crystal device, reflected light that has no polarity, like that described above, is effective if the image displayed is viewed from an angle in which the brightness thereof is uniform. However, when the display surface of the liquid crystal device is always viewed from one fixed direction, part of the light is supplied in a direction that will not be viewed, and it is thought that this is wasteful.

The present invention was developed in view of the aforementioned problem, and an object thereof is to increase the brightness of a display when viewed from the desired direction by preventing reflected light from traveling to unnecessary angles of view, and increasing the amount of reflected light that moves to a desired angle of view.

SUMMARY OF THE INVENTION

First, the principle of the present invention will be described. As shown in FIGS. 14(a) and 14(b), consider a substrate 80 in which a reflecting film 82 formed on a surface of a base 81, and a plurality of pyramid shaped convexities 10 are arranged in a dot matrix pattern on the reflecting film 82. In this case, as shown in FIG. 15(a), a plane section T of each convexity 10 is square, and symmetrical with respect to both directions of orthogonal X and Y axes. In addition, the four lateral faces of convexity 10 shown in FIG. 15(a) are labeled as "A", "B", "C", and "D", and the surface of the base is labeled as "E".

As shown by the arrows A in FIG. 14(b), when light is irradiated onto a reflection film 82 in which a plurality of convexities 10 have been formed, and the distribution of reflected light with respect to the direction of the Y axis in FIG. 15(a) is measured, as shown in FIG. 16, a large quantity of reflected light e is generated corresponding to plane E (which has a large surface area), and quantities of reflected light a and c are generated corresponding to planes A and B at an angle of, for example, plus or minus 30 degrees. The distribution of light with respect to the direction of the X axis is exactly the same, and the effect of this is that when light is irradiated onto the substrate 80 of FIG. 14(a), a spatially omnidirectional, uniform non-polar reflected light is obtained.

Next, consider a convexity 10e shown in FIG. 15(b) in which the lateral surface A of convexity 10 in FIG. 15(a) has been extended in the direction of the Y axis. As a result, with respect to this convexity 10e, the angle of inclination θ2 of the lateral surface A' of the base 25 is smaller than the angle of inclination θ1 of the lateral surface C. In addition, the surface area of the lateral surface A' is larger than the surface area of the lateral surface A on convexity 10. Thus, when a light beam is irradiated on this convexity 10e, at a viewing angle of less than 30 degrees (for example 15 degrees as shown in FIG. 16), the amount of reflected light a' that appears is slightly larger than would appear from lateral surface A. Moreover, because plane E has less surface area, there is slightly less reflected light e' from this surface.

In other words, when the shape of convexity 10 is deformed along the Y axis and is made asymmetrical with respect to the X axis, the amount of reflected light in certain unnecessary viewing angles relative to the Y axis can be decreased at the same time that the amount of reflected light in a certain desirable viewing angle can be intentionally increased. As a result, assuming, for example, that the substrate 80 is used as a reflecting plate for a liquid crystal device, the brightness in directions other than that of the viewer's viewing angle can be suppressed, and the brightness in the viewer's viewing angle can be intentionally increased.

The present invention has been achieved based on the aforementioned principle. The substrate for a liquid crystal device related to the present invention is one of a pair of substrates sandwiching liquid crystals and that is positioned opposite from the viewing-side substrate, having a base and a reflecting film formed on the surface of the base. The reflecting film is characterized in that it has a pattern that exhibits the ability to direct and scatter light.

When considering the reflection of normal light, as shown in FIG. 19, a light beam $R_0$ shined at an angle $θ_0$ on a reflecting surface H is reflected at an identical angle $\theta_0$. In this situation, reflecting surface H does not exhibit the ability to direct or scatter light. In FIG. 19, the ability to "direct" light in the aforementioned construction means that the main component of the reflected light beam R1 is reflected at an angle $\theta_1$ that is different from the angle of incidence $\theta_0$. In addition, the ability to "scatter" light means that scattered light is generated between $\theta_2$ and $\theta_3$.

There are times when the angle $\theta_1$ of the main reflected light beam will fall within a range between scattering angles $\theta_2$ and $\theta_3$, and times when it will fall outside this range. However, in most cases the angle $\theta_1$ of the main reflected light beam will be established within a range between scattering angles $\theta_2$ and $\theta_3$, and moreover, it is preferable that the angle $\theta_1$ of the main reflected light beam be established at the center position between scattering angles $\theta_2$ and $\theta_3$. With liquid crystal devices, it is preferable that the difference between angles $\theta_2$ and $\theta_3$ be approximately 30 degrees, and that 60% or more of the total amount of reflected light falls within this range.

According to a substrate for a liquid crystal device constructed as described above, the amount of reflected light directed toward the desired viewing angle can be increased because the angle of reflectance $\theta_1$ of the reflected light beam $R_1$ is different from the angle of incidence $\theta_0$. Because of this, the brightness of the display when seen from the desired direction can be increased.

In a liquid crystal device constructed as described above, the aforementioned pattern can be formed with a plurality of a row of convexities and/or a plurality of a row of concavities. In addition, these convexities and/or concavities can be formed such that their three dimensional shape along one of two orthogonal axes is different from that along the other axis.

For example, with respect to the convexities formed in a multi-dot pattern on the surface of the light reflecting film, a plane section of the convexity 10a shown in FIG. 11(a) is rectangular in shape, and, for example, can be formed in a long dome shape along the X axis, a plane section of the convexity 10b shown in FIG. 11(b) is rectangular in shape, and, for example, can be formed in a long pyramid shape along the X axis, and a plane section of the convexity 10c shown in FIG. 12(c) is elliptical in shape, and, for example, can be formed in a long dome shape along the X axis.

In addition, as shown in FIG. 12(d), the planar shape of the convexity 10d can be formed such that it is a teardrop shape. Here, this teardrop shape has a planar shape in which the pointed end $E_0$ and the gently rounded end $E_1$ are connected by approximately straight lines, and is a shape in which the size D, in this case the convexity height D, of the cross-section thereof becomes larger from the pointed end $E_0$ to the gently rounded end $E_1$.

In addition, the concavities that are formed as a large number of dot patterns on the surface of the light reflecting film can be formed, as shown in FIG. 20(a), such that a plane section thereof is a long, rectangular dome shaped concavity 20a that extends along, for example, the X axis, can be formed, as shown in FIG. 20(b), such that a plane section thereof is a long, rectangular pyramid shaped concavity 20b that extends along, for example, the X axis, or can be formed, as shown in FIG. 21(c), such that a plane section thereof is a long, circular, dome shaped concavity 20c that extends along, for example, the X axis.

In addition, as shown in FIG. 21(d), the planar shape of the concavity 20d can be formed such that it is a teardrop shape. Here, this teardrop shape has a planar shape in which the pointed end $E_0$ and the gently rounded end $E_1$ are connected by approximately straight lines, and is a shape in which the size D, in this case the concavity depth D, of the cross-section thereof becomes larger from the pointed end $E_0$ to the gently rounded end $E_1$.

According to a substrate for a liquid crystal device constructed in the manner described above, the light reflecting film does not uniformly reflect a beam of light irradiated thereon throughout a space, but rather reflects the light beam such that the quantity of light or the intensity thereof at a certain viewing angle is increased. This prevents the reflected light from traveling to unnecessary viewing angles, can increase the quantity of reflected light that is directed to a desired viewing angle, and can increase the brightness of the display when seen from the desired direction.

Next, in a substrate for a liquid crystal device constructed as described above, the aforementioned convexities and/or concavities can be formed such that they are bisected into two spatial shapes by at least one axis of two axes that orthogonally pass through said convexities and/or concavities themselves, the two spatial shapes being asymmetric with respect to each other.

For example, as shown in FIG. 15(b), the convexities on the light reflecting film can be pyramid shapes 10e in which the surface area of one lateral surface A' is larger than that of the opposing lateral surface C, and the angle of inclination of lateral surface A' with respect to the base 25 is smaller than that of lateral surface C. In this shape, the left portion of the spatial shape bisected by the X axis is asymmetric with respect to the right portion of the spatial shape.

In addition, as shown in FIG. 12(d), the convexities on the light reflecting film can be formed such that the upper and lower portion of the spatial shape is bisected by the Y axis so that they are asymmetrical with respect to each other.

In addition, as shown in FIG. 22, the concavities in the light reflecting film can be pyramid shapes 20e, in which the surface area of one lateral surface A' is larger than that of the opposing lateral surface C, and the angle of inclination of lateral surface A' with respect to the base 25 is smaller than that of lateral surface C. In this shape, the left portion of the spatial shape bisected by the X axis is asymmetric with respect to the right portion of the spatial shape. Further, as shown in FIG. 21(d), the concavities in the light reflecting film can be formed such that the upper portion of the spatial shape bisected by the Y axis is asymmetric with respect to the lower portion of the spatial shape.

According to a substrate for a liquid crystal device constructed as described above, the light reflecting film does not uniformly reflect a beam of light irradiated thereon throughout a space, but rather reflects the light beam such that the quantity of light or the intensity thereof at a certain viewing angle is increased. This prevents the reflected light from traveling to unnecessary viewing angles, can increase the quantity of reflected light that is directed to a desired viewing angle, and can increase the brightness of the display when seen from the desired direction.

In a substrate for a liquid crystal device constructed as described above, specific examples of the parts of the spatial shapes that are bisected by an axis and asymmetric with respect to that axis will now be considered, e.g., asymmetry with respect to the surface area, asymmetry with respect to the angle formed with the base, etc. Asymmetry with respect to the surface area can be achieved, for example, by making the surface area of the left (of the X axis) lateral surface C different from the surface area of the right lateral surface A', like the convexity 10e in FIG. 15(b), or, for example, by making the surface area of the left (of the X axis) lateral surface C different from the surface area of the right lateral surface A', like the concavity 20e in FIG. 22.

Asymmetry with respect to angles can be achieved, for example, by making the angle $\theta_1$ formed between the left (of the X axis) lateral surface C and the base 25 different from the angle $\theta_2$ formed between the right lateral surface A' and the base 25, like the convexity 10e in FIG. 15(b), or, for example, by making the angle $\theta_1$ formed between the left (of the X axis) lateral surface C and the base 25 different from the angle $\theta_2$ formed between the right lateral surface A' and the base 25, like the concavity 20e in FIG. 22.

Next, in a substrate for a liquid crystal device constructed as described above, it is preferable that at least one of the two orthogonal axes for defining the shape of the convexities s and/or concavities is parallel with the edges of the aforementioned base. This allows the disposition of a light scattering pattern on a base that is made up of an arrangement of a plurality of convexities and/or plurality of concavities to be uniquely determined. As a result, the direction from which the base provides a bright display can be easily determined.

Next, in a substrate for a liquid crystal device constructed as described above, it is preferable that the aforementioned plurality of convexities and/or plurality of concavities are all in the same direction, and that they are arranged on the plane in a random fashion. Further, in order for the directivity of the reflected light to be maintained in the substrate of the present invention, it is important that the plurality of the convexities are pointed in the same direction. Moreover, in order to prevent the generation of unnecessary optical phenomenon due to light interference and the like, it is preferable that the plurality of convexities be randomly arranged on the plane.

Next, a substrate for a liquid crystal device according to the present invention is one of a pair of substrates sandwiching liquid crystals and that is positioned opposite from the viewing-side substrate, having a base and a light reflecting film formed on the surface of the base. The present invention is characterized in that a light reflecting pattern is formed on the surface of the aforementioned light reflecting film and is made up of a plurality of convexities and/or concavities arranged thereon, and with respect to the quantity of light reflected on the aforementioned light reflecting pattern, the profile of the quantity of light along the first of the two orthogonal axes that pass through the aforementioned convexities and/or concavities is different from the profile of the quantity of light along the second of the two orthogonal axes.

According to a substrate for a liquid crystal device constructed in this manner, the light reflecting film does not uniformly reflect the light irradiated thereon in all directions of a space, but rather reflects the light such that the amount or the intensity thereof is increased in a certain direction. This prevents the reflected light from traveling in unnecessary viewing directions, allows the quantity of reflected light that moves in the desired viewing direction to be increased, and allows the brightness of a display to be increased when it is viewed from the desired direction.

For example, when the quantity of reflected light is measured with the measuring system shown in FIG. 17, as shown by the profile obtained in FIG. 13, a substrate for a liquid crystal device constructed as described above can be achieved due to the fact that the characteristics of the reflected light pattern are that the light quantity profile $Q_y$ along one axis has a convexity shape and the light quantity profile $Q_x$ along the other axis is a straight line.

If a substrate for a liquid crystal device having the characteristics shown in FIG. 13 is used, when one moves their eyes along the Y direction, the display will have a central portion that is bright, while both edges will be dark. On the other hand, when one moves their eyes along the X direction, there will be a uniform brightness from one edge of the display to the other. If the visual performance along the X direction and the visual performance along the Y direction are compared, the visual performance along the X direction produces greater brightness when both edges of the display screen are viewed, i.e., when the display screen is viewed from a low angle.

Next, in a method of manufacturing a substrate for a liquid crystal device that is one of a pair of substrates sandwiching liquid crystals and that is opposite from the viewing-side substrate, a method of manufacturing a substrate for a liquid crystal device according to the present invention has the steps of forming a light reflecting film on the surface of a base, and of using a mask to form a plurality of convexities and/or concavities on the surface of the aforementioned light reflecting film. The mask pattern of the aforementioned mask for the aforementioned plurality of convexities and/or concavities is characterized in that the shape along a first of the two orthogonal axes that pass through said convexities and/or concavities themselves is different from the shape along the second axis. According to the method of manufacturing a substrate for a liquid crystal device with this construction, the aforementioned substrate for a liquid crystal device can be reliably manufactured.

Next, in a method of manufacturing a substrate for a liquid crystal device that is one of a pair of substrates sandwiching liquid crystals and that is opposite from the viewing-side substrate, a method of manufacturing a substrate for a liquid crystal device according to the present invention has the steps of forming a light reflecting film on the surface of a base, and of using a mask to form a plurality of convexities and/or concavities on the surface of the aforementioned light reflecting film. The mask pattern of the aforementioned mask for the aforementioned plurality of convexities and/or concavities is characterized in that at least one axis of the two orthogonal axes that pass through said convexities and/or concavities themselves bisects each shape, with one side of each shape being asymmetrical with respect to the other side thereof. According to the method of manufacturing the substrate for a liquid crystal device with this construction, the aforementioned substrate for a liquid crystal device can be reliably manufactured.

In the method of manufacturing a substrate for a liquid crystal device constructed as described above, the aforementioned mask pattern of the masks for the aforementioned plurality of convexities and/or plurality of concavities can be shaped as flat teardrops. Here, a flat teardrop shape means a planar shape in which a pointed first end and a gently curved second end are connected by approximately straight lines. In addition, in the method of manufacturing the substrate for a liquid crystal device constructed as described above, the aforementioned mask pattern of the mask for the aforementioned plurality of convexities and/or plurality of concavities can be all in the same direction, and can be randomly arranged on the plane.

Next, in a liquid crystal device having a pair of substrates in which liquid crystals are sandwiched therebetween, a liquid crystal device according to the present invention is characterized in that one of the aforementioned pair of substrates is comprised of any of the substrates for a liquid crystal device described above.

According to a liquid crystal device with this construction, the quantity of reflected light that is directed to the desired viewing direction can be increased because the interior light reflecting film reflects light, and the reflecting angle of the light supplied by the liquid crystal layer can be set to an angle outside the angle of incidence of that light. This allows the brightness of the display to be increased when the display of the liquid crystal device is viewed from the desired direction.

Next, in a method of manufacturing a liquid crystal device having a pair of substrates in which a liquid crystal is sandwiched therebetween, a method of manufacturing a liquid crystal device according to the present invention is characterized by the step of forming one of the aforementioned pair of substrates using the method of manufacturing a substrate for a liquid crystal device described above.

Next, in an electronic apparatus having a liquid crystal device that displays an image, a case that accommodates the aforementioned liquid crystal device, and a control circuit that controls the aforementioned liquid crystal device, the aforementioned liquid crystal device is comprised of a liquid crystal device constructed as described above. According to this electronic apparatus, a clear image can be formed for the person viewing the display of the liquid crystal device in a desired viewing direction.

DETAILED DESCRIPTION OF THE PREFERRED EMBODIMENTS OF THE INVENTION

A more complete description will be provided below based on the embodiments of the present invention.

Figure 1:
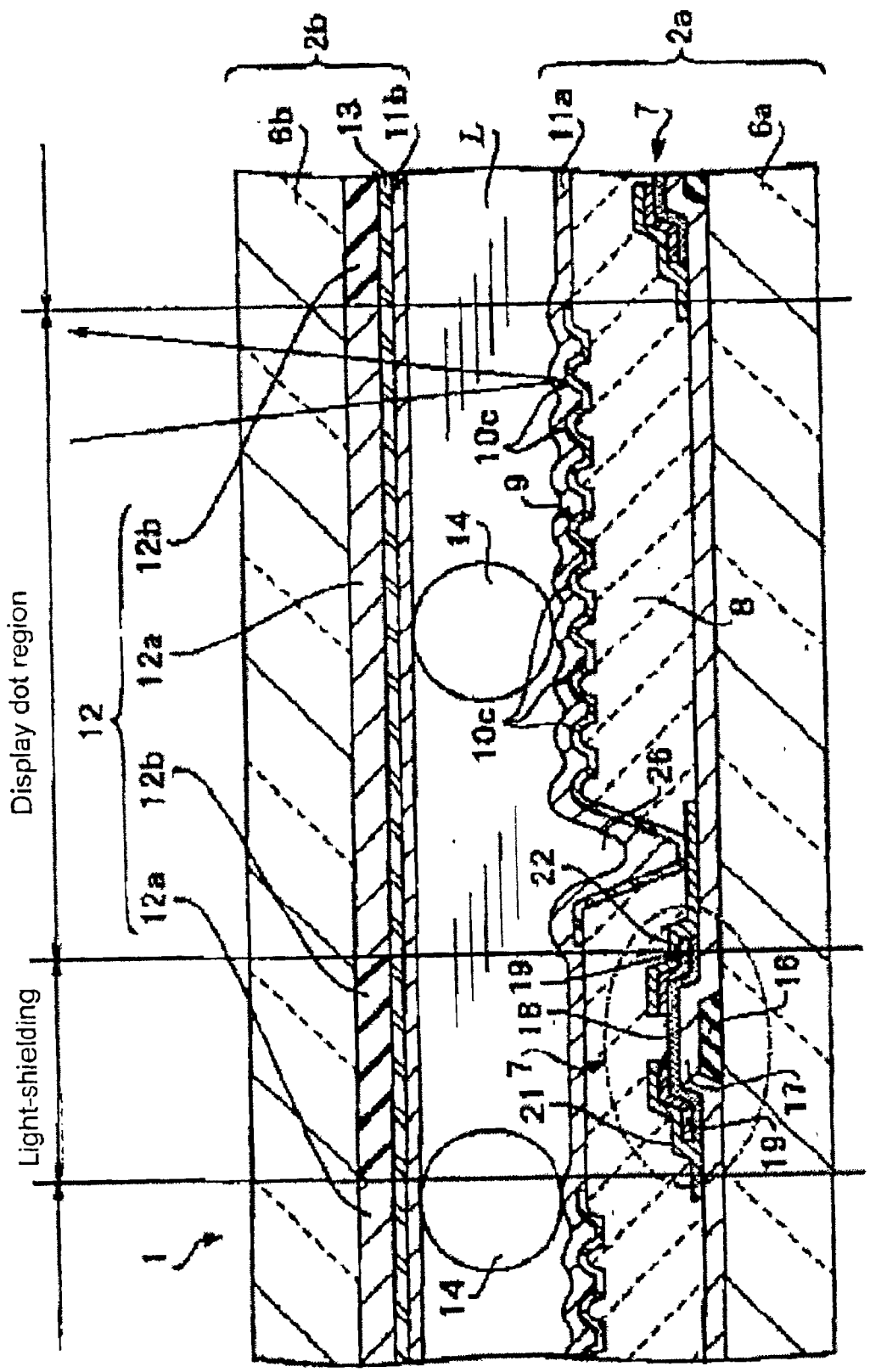
FIG. 1 is a cross sectional view showing a cross section of the main components of an embodiment of a substrate for a liquid crystal device according to the present invention, and a liquid crystal device constructed using this substrate for a liquid crystal device.
Figure 2:
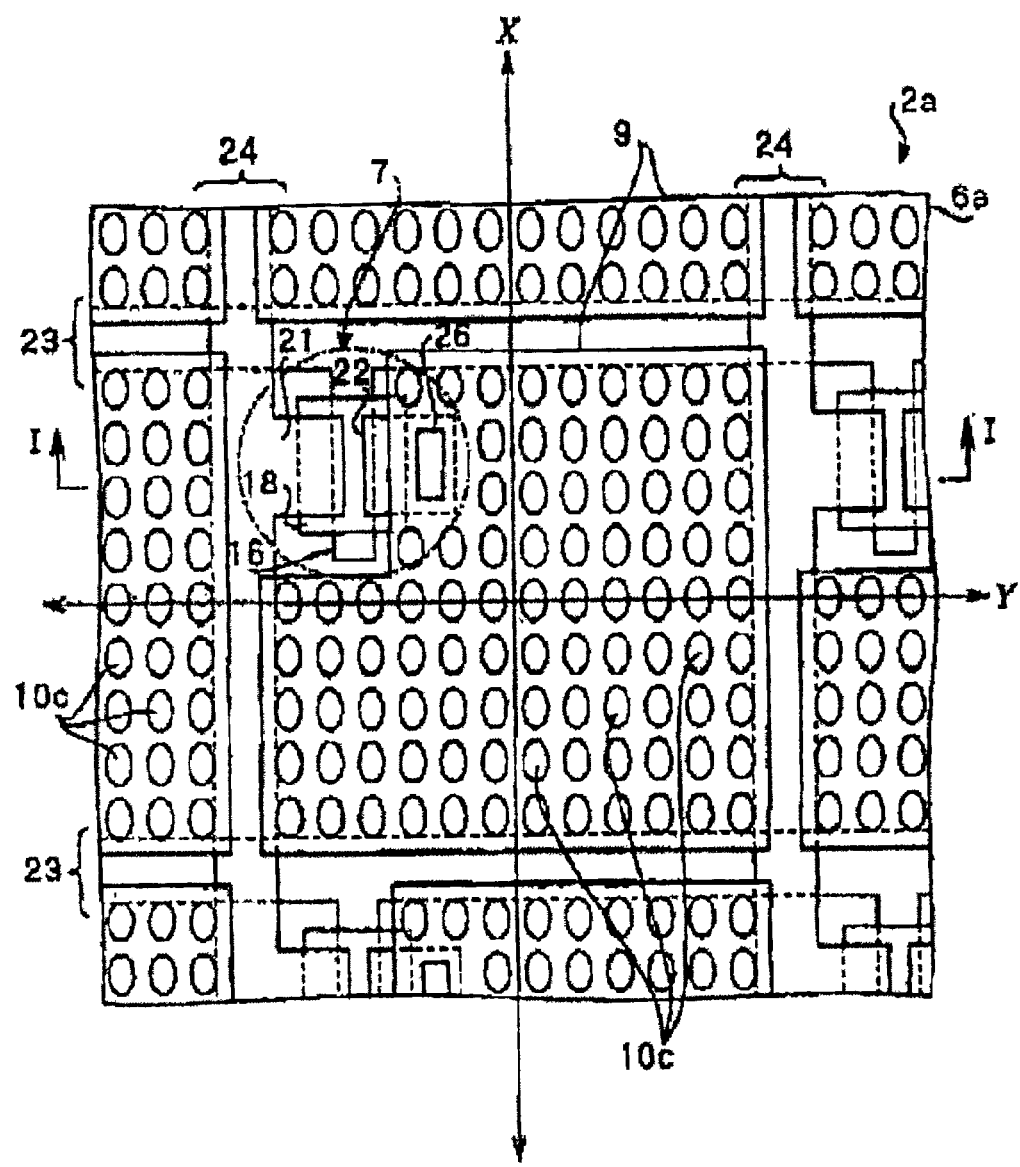
FIG. 2 is a plan view of the main components of the substrate for a liquid crystal device employed in FIG. 1.
Figure 3:
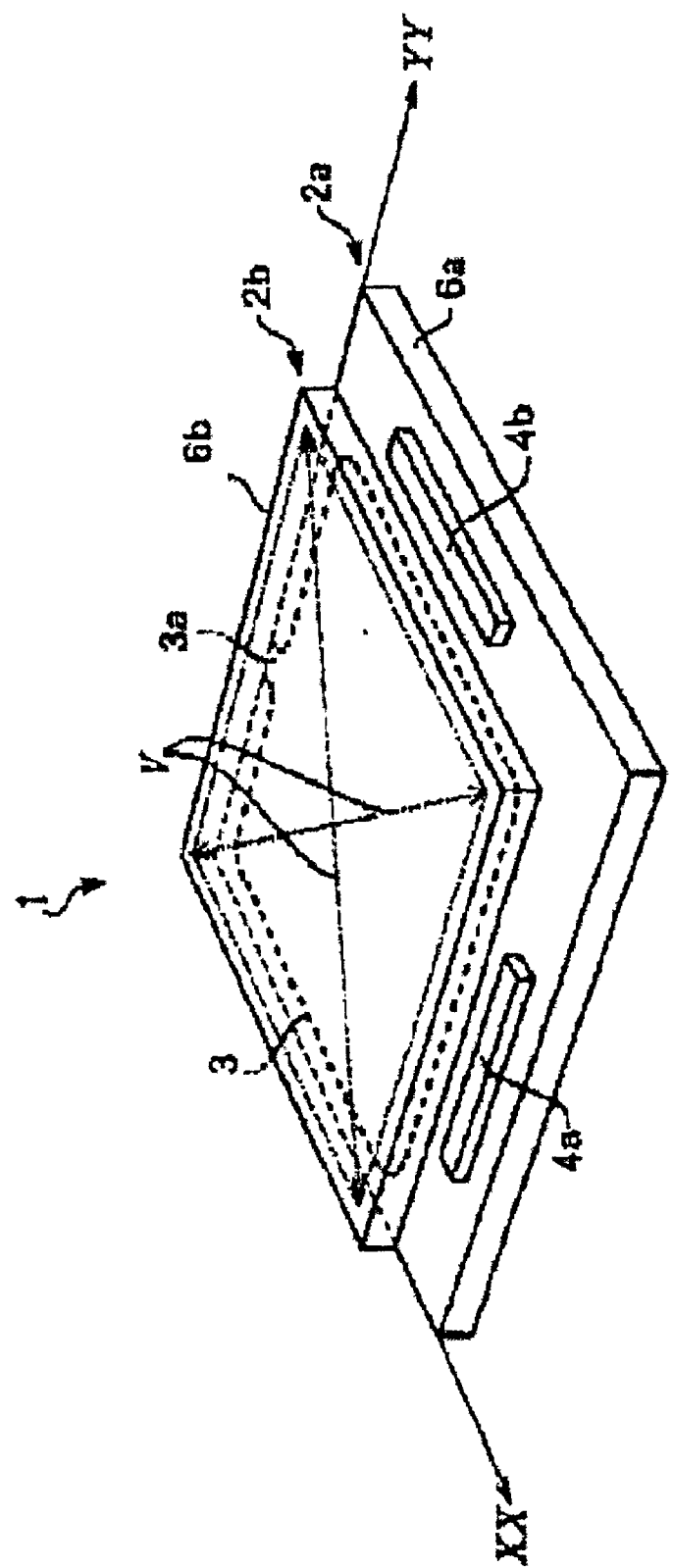
FIG. 3 is a perspective view showing an embodiment of a liquid crystal device according to the present invention.

FIGS. 1 and 2 show the main components of a first embodiment of a liquid crystal device according to the present invention that employs a substrate for a liquid crystal device according to the present invention, and in particular one enlarged display dot portion. The overall construction of this liquid crystal device can be established as shown in FIG. 3. In addition, for example, if one considers the situation in which full color display takes place by means of the three primary colors R (red), G (green), and B(blue), the aforementioned one display dot is a dot that corresponds to each of the respective three colors, and one pixel is formed by grouping three of these display dots together. In addition, if one considers the situation in which black and white display takes place, the aforementioned one display dot corresponds to one pixel.

A liquid crystal display according to the present embodiment is an active matrix type of liquid crystal device that employs a TFT (Thin Film Transistor), which is a three terminal type of active device, a reflection type of liquid crystal device in which display occurs by employing outside light such as natural light and the like, and is a COG (Chip On Glass) type of liquid crystal device in which ICs for the liquid crystal driver are directly mounted on the substrate.

In FIG. 3, the liquid crystal device 1 includes a first substrate 2a and a second substrate 2b that are attached together around the circumference thereof by means of a circular seal member 3. In addition, the liquid crystal device 1 is formed by enclosing liquid crystals in a gap, in other words a cell gap, formed by the first substrate 2a, the second substrate 2b, and the seal member 3. Further, in the present embodiment, ICs 4a and 4b for the liquid crystal driver are mounted directly to the surface of the substrate 2a.

A plurality of pixel electrodes are formed and arranged in a dot matrix pattern of rows XX and columns YY inside the area of the first substrate 2a defined by the seal member 3. In addition, planar electrode are formed with no pattern inside the area of the second substrate 2b defined by the seal member 3, and these planar electrodes are disposed on the first substrate 2a opposite the plurality of pixel electrodes.

A portion of the liquid crystal interposed between one pixel electrode on the first substrate 2a and a planar electrode on the second substrate 2b forms one display dot. A plurality of these display dots are formed in a display area V by arranging them in a dot matrix pattern inside the area defined by the seal member 3. ICs 4a and 4b for driving the liquid crystal control the orientation of the liquid crystal in each display dot by selectively applying a scan signal and a data signal between the opposing electrodes that form the plurality of display dots. By controlling the orientation of this liquid crystal, the light that passes through the liquid crystal is modulated, and an image consisting of characters, numbers, and the like is displayed inside the display area V.

FIG. 1 shows one enlarged cross section of a display dot from amongst a plurality thereof formed inside the display area V in the liquid crystal device 1. In addition, FIG. 2 shows a plan view of those display dots. Moreover, FIG. 1 shows a cross section taken along line I—I in FIG. 2.

In FIG. 1, the first substrate 2a has a base 6a that is formed from glass, plastic or the like, a TFT (Thin Film Transistor) active element that is formed on the base 6a and functions as a switching element, and a pixel electrode 9 sandwiching an organic insulation film 8 and formed on the upper layer of the TFT 7. An alignment film 11a is formed on top of the pixel electrode 9, and a rubbing process is performed as an orientation process with respect to this alignment film 11a. The pixel electrodes 9 are formed from conductive materials that have the ability to reflect light, such as Al (aluminum), Ag (silver), and the like.

The second substrate 2b that faces the first substrate 2a has a base 6b that is formed from glass, plastic, or the like, a color filter 12 that is formed on the base 6b, a transparent electrode 13 that is formed on the color filter 12, and an alignment film 11b that is formed on the electrode 13. The electrode 13 is a planar ITO (Indium Tin Oxide) electrode that is formed on the entire surface area of the base 6b.

The color filter 12 has a filter element 12a in the position facing the pixel electrode 9 on the first substrate 2a that is either R (red), G (green) and B (blue), or C (cyan), M (magenta) and Y (yellow), and a black mask 12b in a position that does not face the pixel electrode 9.

In FIG. 1, the width of the gap between the first substrate 2a and the second substrate 2b, in other words the cell gap, is maintained by means of spherical spacers 14 dispersed on the surface of either one of the substrates. The liquid crystal L is enclosed inside this cell gap.

TFT 7 has a gate electrode 16 formed on the base 6a, a gate insulating film 17 formed on top of the gate electrode 16 and the entire surface of the base 6a, a semiconductor layer 18 sandwiching the gate insulating film 17 and formed in a position above the gate electrode 16, a source electrode 21 that is formed on a first side of the semiconductor layer 18 via a contact electrode 19, and a drain electrode 22 that is formed on a second side of the semiconductor layer 18 via the contact electrode 19.

As shown in FIG. 2, gate electrodes 16 extend from gate bus wires 23. In addition, source electrodes 21 extend from source bus wires 24. The gate bus wires 23 extend in the longitudinal direction of the base 6a, and are composed of a plurality of wires that are equally spaced and run parallel with each other. In addition, the source bus wires 24 sandwiching the gate insulating film 17 (see FIG. 1), extend in the transversal direction such that they intersect with the gate bus wires 23, and are composed of a plurality of wires that are equally spaced and run parallel with each other in the longitudinal direction.

The gate bus wires 23 are connected to a first end of the ICs 4a and 4b for driving the liquid crystal shown in FIG. 3, and for example are used as scanning lines. On the other hand, the source bus wires 24 are connected to a second end of the ICs 4a and 4b, and for example are used as signal lines. In addition, as shown in FIG. 2, the pixel electrodes 9 are formed such that they cover everything within the square area defined by the intersection of the gate bus wires 23 and the source bus wires 24 except for the portion of the area that faces the TFT 7.

The gate bus wires 23 and the gate electrodes 16 are formed from, for example, chrome, tantalum, and the like. The gate insulating film 17 is formed from, for example, silicon nitride ($SiN_x$), silicon oxide ($SiO_x$), and the like. The semiconductor film 18 is formed from, for example, a-Si, polycrystalline silicon, CdSe, and the like. The contact electrode 19 is formed, for example, from a-Si and the like. The source electrode 21, the source bus wire 24 integral therewith, and the drain electrode 22, are, for example, formed from titanium, molybdenum, aluminum, and the like.

The organic insulating film 8 shown in FIG. 1 covers the source bus wires 24 and the TFT 7, and is formed on the entire surface of base 6a. However, a contact hole 26 is formed in the portion of the organic insulating film 8 that is opposite the drain electrode 22. The location of this contact hole 26 allows conduction between the pixel electrodes 9 and the drain electrodes 22 on the TFT 7. In the area in which the pixel electrodes 9 are formed on the organic insulating film 8, long elliptical dome shaped convexities 10c shown in FIG. 12(c), for example, are formed such that they are arranged in minute regular intervals, and in the present embodiment, are formed in a regular matrix pattern. As a result, all of the pixel electrodes 9 that are stacked on the top of the organic insulating film 8 likewise have a light reflecting pattern comprised of a plurality of convexities 10c.

In FIG. 2, the aforementioned convexities 10c are arranged such that the major axes thereof run in the same direction as the X axis and the source bus wire 24, and the minor axes thereof run in the same direction as the Y axis which is orthogonal with the X axis. In addition, in FIG. 3 the major axis direction X of the convexities 10c run parallel with respect to the line XX on the edges of base 6a, and the minor axis direction Y run parallel with respect to the line YY on the edges of base 6a. In this way, if there is an association between the direction of the lines X, Y that define the convexities 10c, and the lines XX, YY that run along the edges of the substrate 6a of the liquid crystal display 1, it will be easy to determine the direction from which one can see a bright display when the display area V of the liquid crystal device 1 is viewed.

Figure 19:
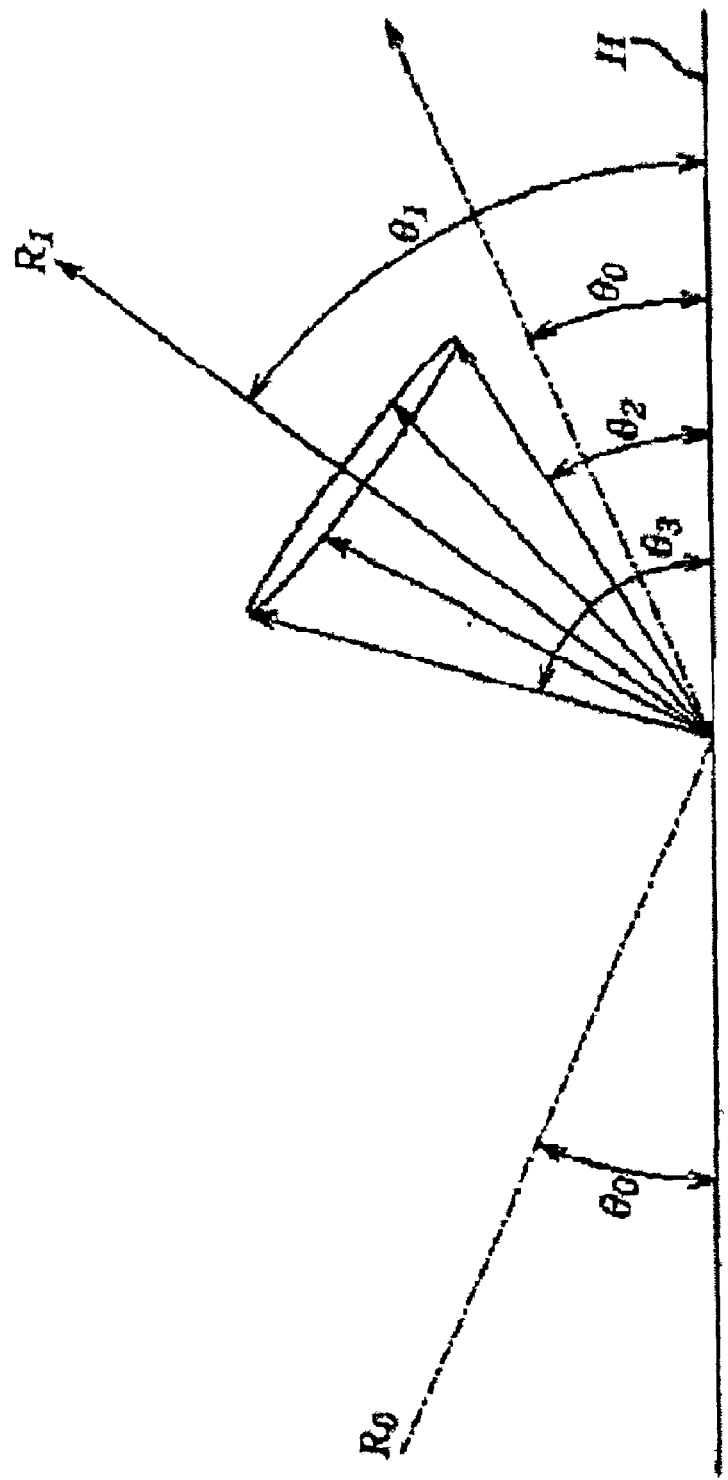
FIG. 19 is a chart for describing the directivity and scattering of reflected light.

In the present embodiment, the pixel electrodes 9 can be made to function as a light reflecting film by forming them from a conductive material that has the ability to reflect light such as, for example, Al (aluminum) and Ag (silver). In addition, because a reflecting pattern is provided on the surface of the pixel electrodes 9 which is composed of a plurality of convexities 10c, the pixel electrodes 9 function as a reflecting pattern that, as shown in FIG. 19, displays the ability to both direct and scatter light.

Because the liquid crystal device 1 of the present embodiment is constructed as described above, in FIG. 1, external light that enters the interior of the liquid crystal device 1 from the viewing side, i.e., the second substrate 2b side, passes through the liquid crystal L, arrives at the pixel electrodes 9 formed from light reflecting materials, reflects off of these electrodes 9, and is again supplied to the liquid crystal L. The orientation of the liquid crystal L is controlled by each display dot by means of a voltage applied between the pixel electrodes 9 selected by the scanning signal and the data signal and the opposing electrodes 13, and because of this, an image composed of characters, numbers, and the like are displayed to the viewer.

In the present embodiment, because the reflecting pattern is formed to be a regularly arranged plurality of convexities 10c on the surface of a pixel electrode 9 that is used as a light reflecting film, and the spatial shape of the plurality of convexities 10c along the X axis are different from the spatial shape along the Y axis, the quantity of light reflected to a particular viewing direction can be suppressed to a low level, and the quantity of light reflected to another fixed viewing direction can be increased. As a result, the image that is displayed in the display area V of the liquid crystal device 1 to a viewer can be exceptionally bright in a certain viewing direction.

Figure 4:
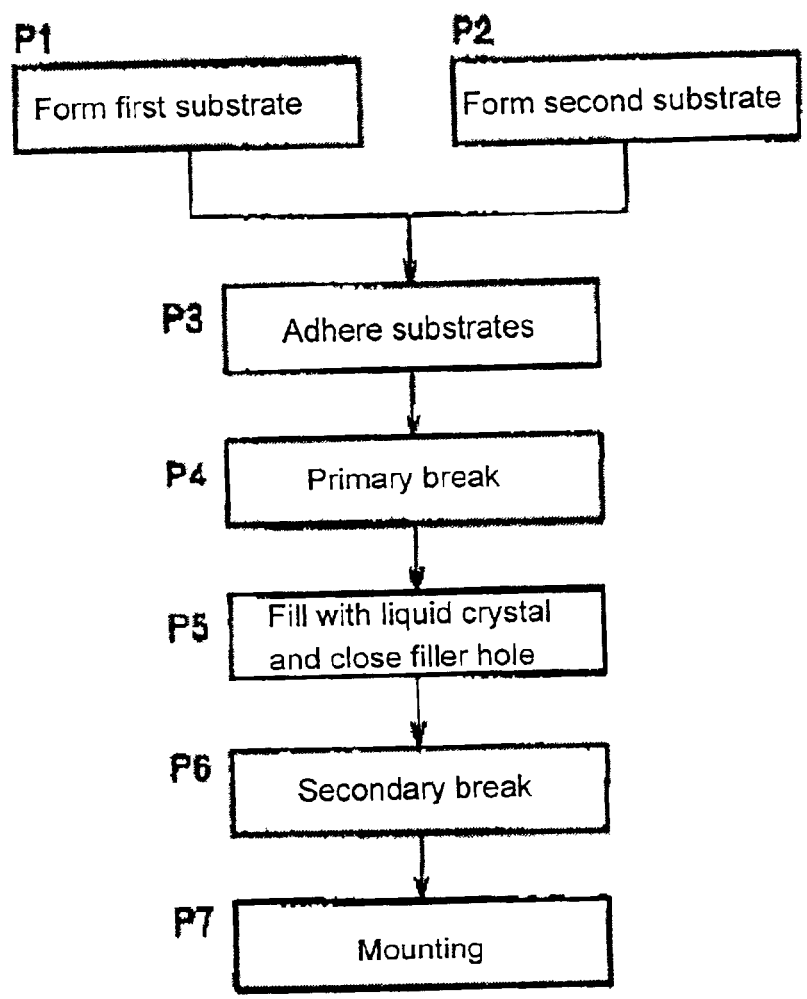
FIG. 4 is a flowchart showing an embodiment of a method of manufacturing a liquid crystal device according to the present invention.

FIG. 4 shows the manufacturing steps for the liquid crystal device 1 shown in FIG. 1. If the method of manufacturing the liquid crystal display 1 is described based upon this flow chart, first, in step P1, the first substrate 2a (see FIG. 1) is produced, and in step P2, the second substrate 2b is produced. In a normal manufacturing process, the first substrate 2a and the second substrate 2a for the liquid crystal device 1 shown in FIG. 1 are not produced one by one, but rather, a plurality of first substrates 2a for a liquid crystal device are formed on one base with a large surface area, in other words, on a surface of a motherboard, and a plurality of second substrates 2b for a liquid crystal device are formed on the surface of another motherboard.

Afterward, a first substrate motherboard on which a plurality of first substrate patterns are formed is aligned with a second substrate motherboard on which a plurality of second substrate patterns are formed. In other words, the substrates are attached together in the aligned state by means of the seal member 3, thereby forming a panel with a large empty interior (Step P3). Next, in order to expose a liquid crystal filler hole 3a (see FIG. 3) formed in a part of the seal member 3 inside each liquid crystal device 1 to the exterior, the aforementioned large surface area panel is broken, or in other words, cut, meaning that strip-shaped panels are formed (Step P4).

Next, the interior of the panel is filled with liquid crystal from the liquid crystal filler hole 3a of the strip-shaped panels that were produced, and the liquid crystal filler hole 3a is sealed with resin after the liquid crystal filling is complete (Step P5). Afterward, the strip shaped panel filled with liquid crystal is broken, i.e., cut to the size of the liquid crystal device 1 shown in FIG. 3 (Step P6), and the ICs 4a and 4b for driving the liquid crystal are mounted to the surface of one of the substrates (Step P7). In addition, a polarizing plate is attached to the outer surface of the first substrate 2a and the second substrate 2b, and if necessary, other optical components are attached, for example, a phase difference plate or the like. This completes the liquid crystal device 1 in FIG. 3.

Figure 5:
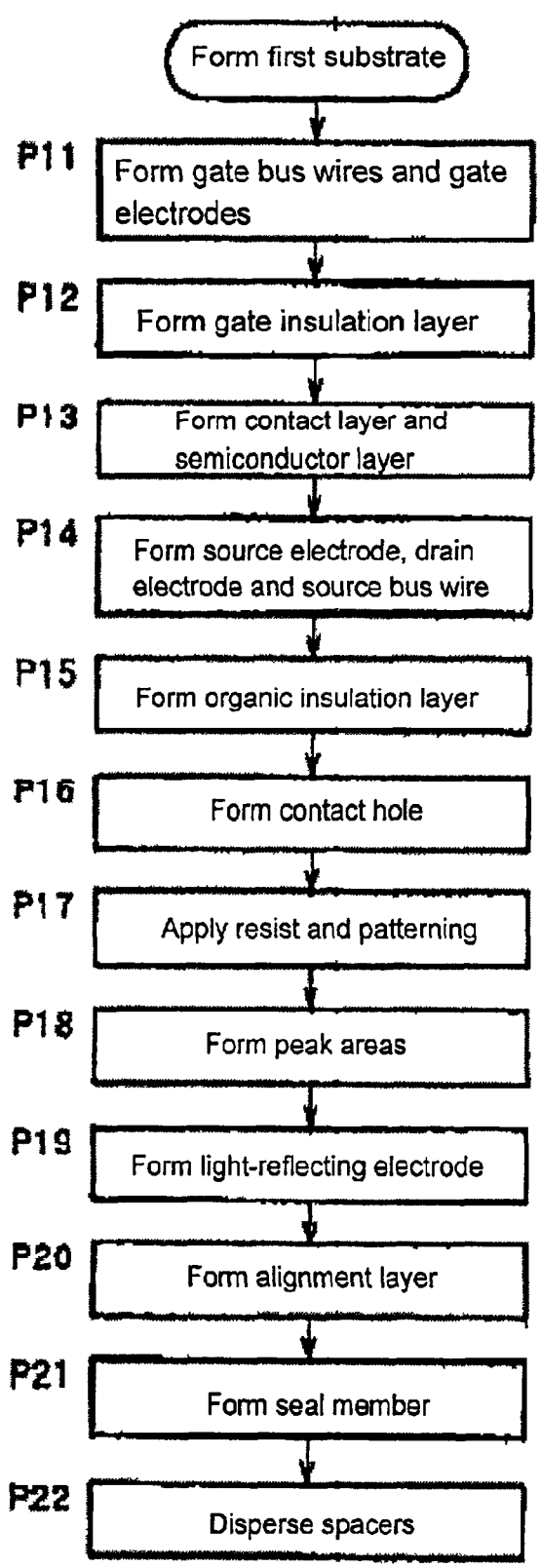
FIG. 5 is a flowchart showing an embodiment of a method of manufacturing a substrate for a liquid crystal device according to the present invention.

In the method of manufacturing a liquid crystal device as described above, the step P1 for forming the first substrate can in particular be achieved by means of the method of manufacturing shown, for example, in FIG. 5. Specifically, in steps P11 and FIG. 6(a), a tantalum metallic film is formed on top of a base 6a comprised of glass and the like by, for example, a sputtering method. This metallic film is patterned by, for example, photolithography, thereby forming gate bus wires 23 and gate electrodes 16 integral therewith.

Figure 6:
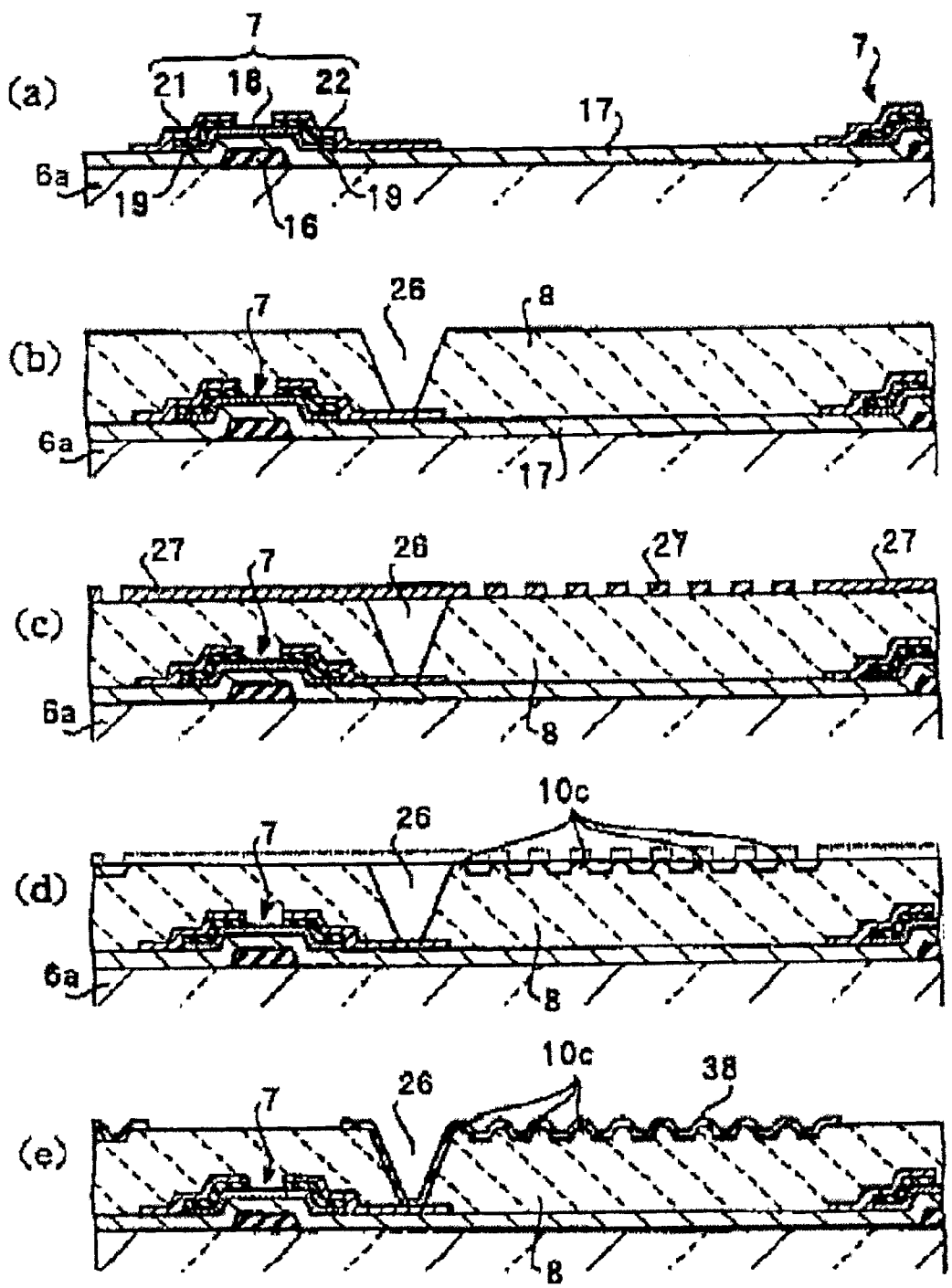
FIG. 6 is a figure showing the order of formation of the substrate corresponding to the flowchart shown in FIG. 5.

Next, in step P12 and FIG. 6(a), a gate insulating film 17 comprising silicon nitride is formed by, for example, the plasma CVD method. Next, in step P13 and FIG. 6(a), a semiconductor layer 18 comprised of a-Si, and contact electrodes 19 comprised of an $n^+$ type a-Si layer are consecutively formed in this order. In addition, patterning is performed on the $n^+$ type a-Si layer and the a-Si layer, thereby forming the semiconductor layer 18 and the contact electrodes 19.

Next, in step P14 and FIG. 6(a), a molybdenum metallic layer, for example, is formed on the entire surface of the base 6a by sputtering, and patterning takes place on this molybdenum metallic layer, forming source electrodes 21, and drain electrodes 22 and source bus wires 24. This completes the formation of the TFT 7. Next, in step 15 and FIG. 6(b), an organic insulating film 8 is formed on the entire surface of the base 6a and the TFT 7 formed thereof by spin coating a polyimide resin, for example, thereon.

Figure 7:
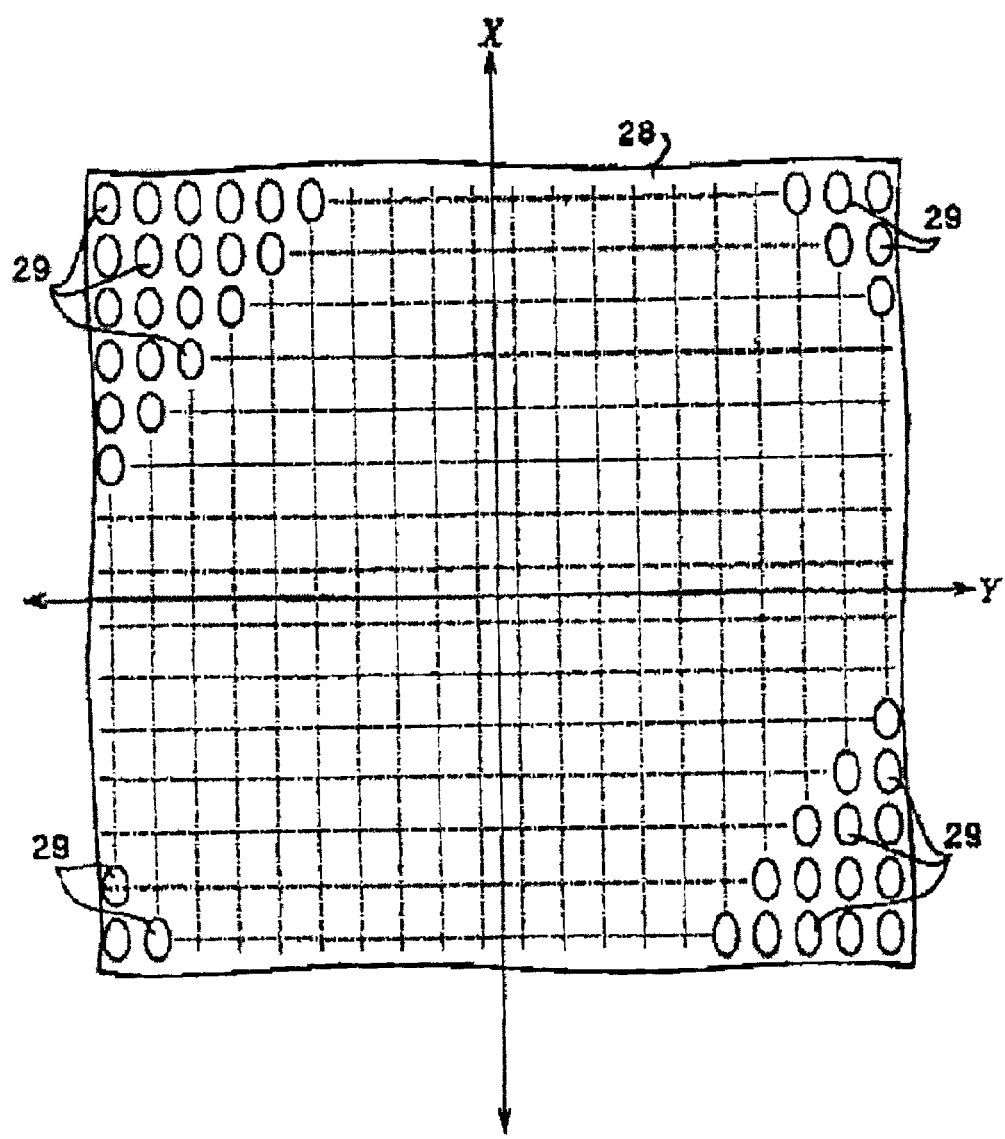
FIG. 7 is a plan view showing an example of a mask employed in the method of manufacturing of FIG. 5.

Next, in step 16 and FIG. 6(b), photolithography is employed to form contact holes 26 on the organic insulating film 8. Next, in step 17 and FIG. 6(c), a photo resist 27 is applied on top of the organic insulating film 8, and a mask 28 shown in FIG. 7 is employed, thereby patterning the photo resist 27 that is in the region in which the pixel electrodes 9 will be formed. An elliptically shaped mask pattern 29 having a major axis along the X axis and a minor axis along a Y axis that is orthogonal to the X axis is formed on the mask 28 employed at this time.

Next, in step 18 and FIG. 6(d), the organic insulating film 8 that is not covered with the photo resist 27 is removed by etching, thereby forming convexities 10c that are in regular rows. At this time, the organic insulating film 8 on top of the contact holes 26 and the TFT 7 is protected by the photo resist 27, and is not removed by etching. After the etching process, the photo resist 27 can be removed by chemicals and photo irradiation.

Afterward, in step P19 and FIG. 6(e), an aluminum layer is formed on the entire area on top of the organic insulating film 8, and patterning takes place to form pixel electrodes 38 that serve also as a light reflecting film. At this time, a pattern, in other words a light reflecting pattern, having pixel electrodes 38 that are the same as the convexities 10*c* is produced because a pattern of convexities 10*c* are formed on the surface of the organic insulating layer 8 that forms the foundation of the pixel electrodes 38. The pixel electrodes 38 are connected with the drain electrodes 22 on the TFT 7 via the contact holes 26 formed in the organic insulating layer 8.

Afterward, in step P20, an alignment film 11*a* (see FIG. 1) is formed on the entire surface of the base 6*a* by applying and baking a polyimide resin thereon. A rubbing process is conducted on this, and in step 21, screen printing and the like is employed, forming a seal member 3 (see FIG. 3). In step P22, spacers 14 (see FIG. 1) are dispersed, and this completes the first substrate 2*a*.

Figure 11:
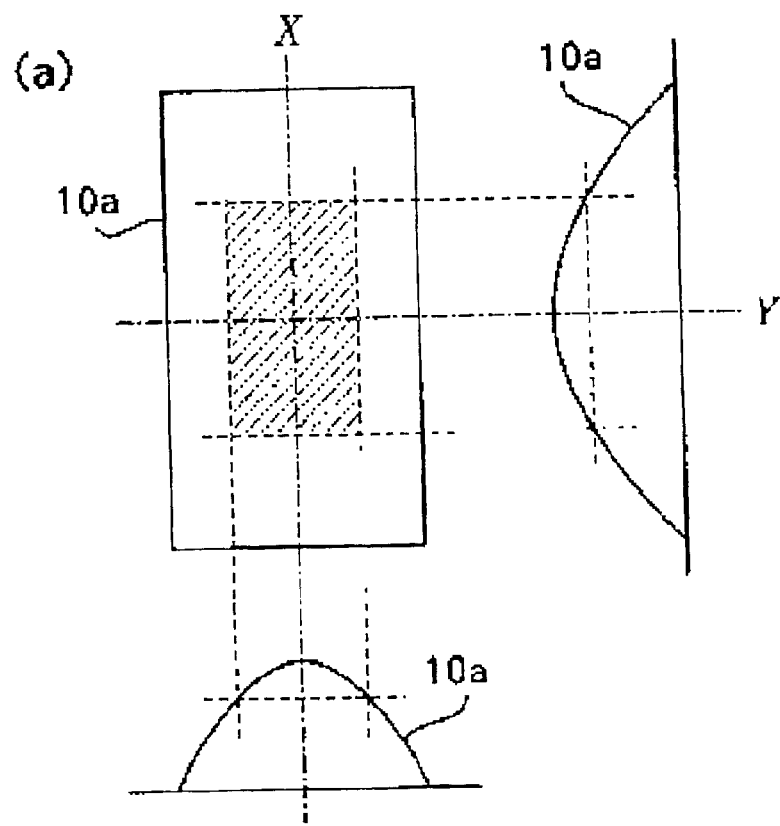
FIG. 11 is a figure showing an example of convexities formed on the surface of a light reflecting film.
Figure 11:
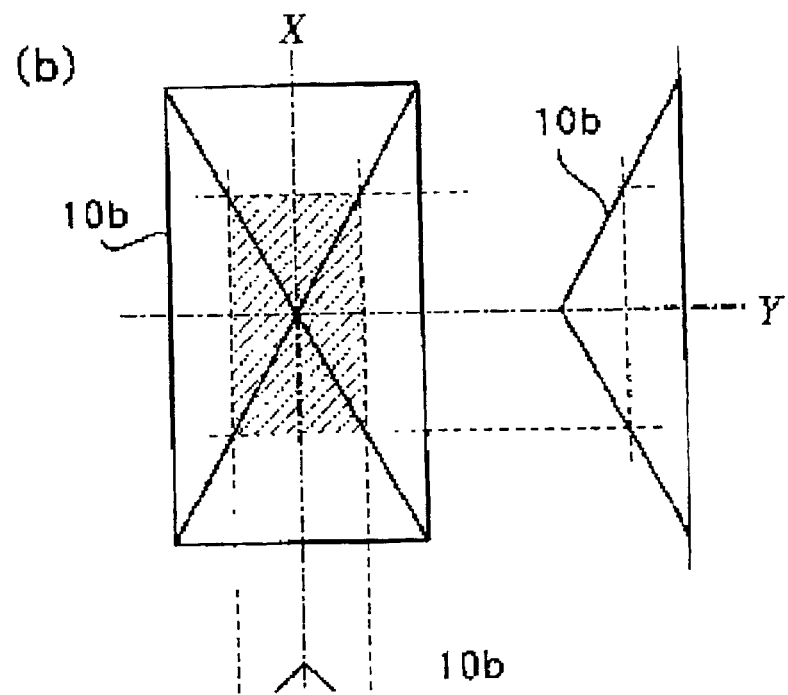
Figure 12:
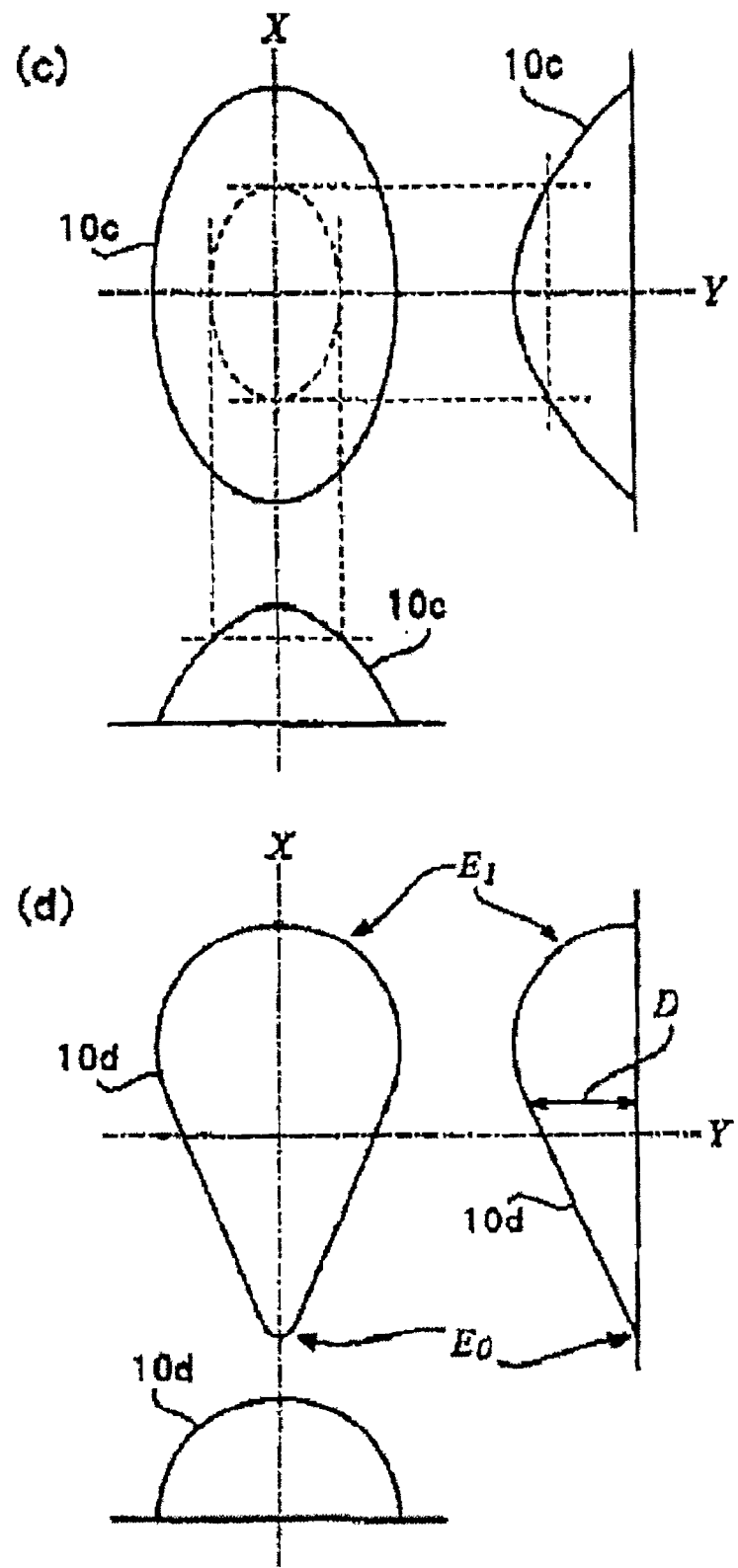
FIG. 12 is a figure showing another example of convexities formed on the surface of a light reflecting film.
Figure 13:
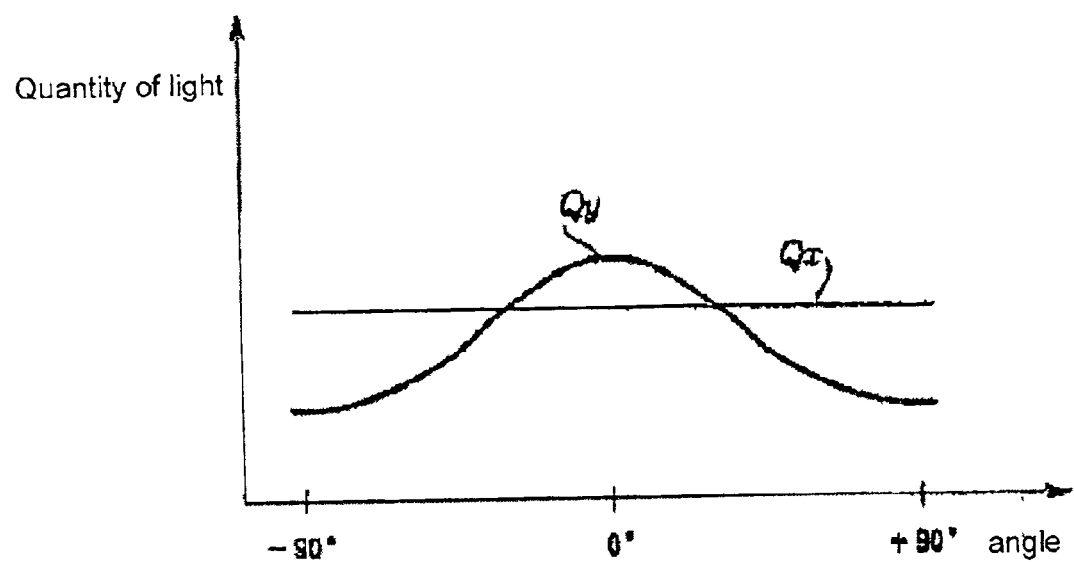
FIG. 13 is a graph showing an example of the amount of reflected light distributed by the convexities or concavity formed on the surface of the light reflecting film.
Figure 14:
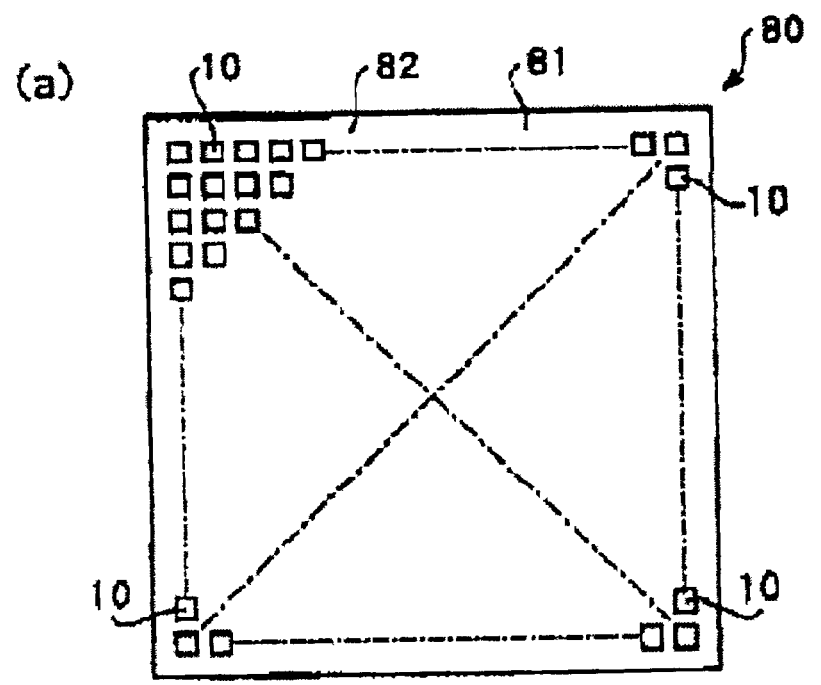
FIG. 14 is a figure showing an example of a conventional substrate for a liquid crystal device.
Figure 14:
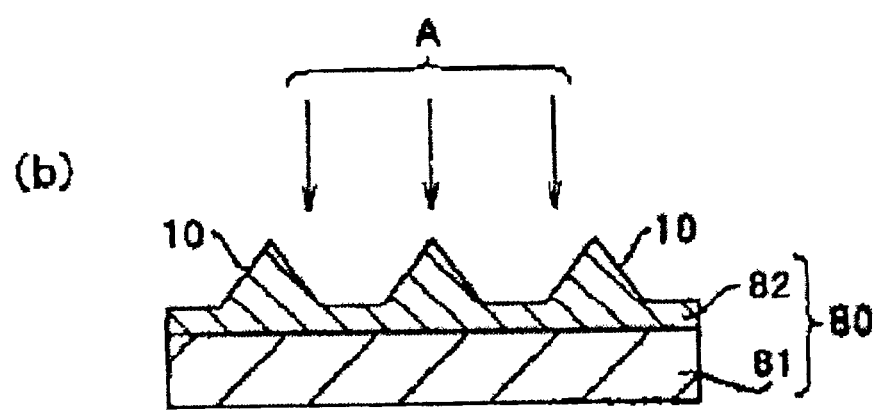
Figure 15:
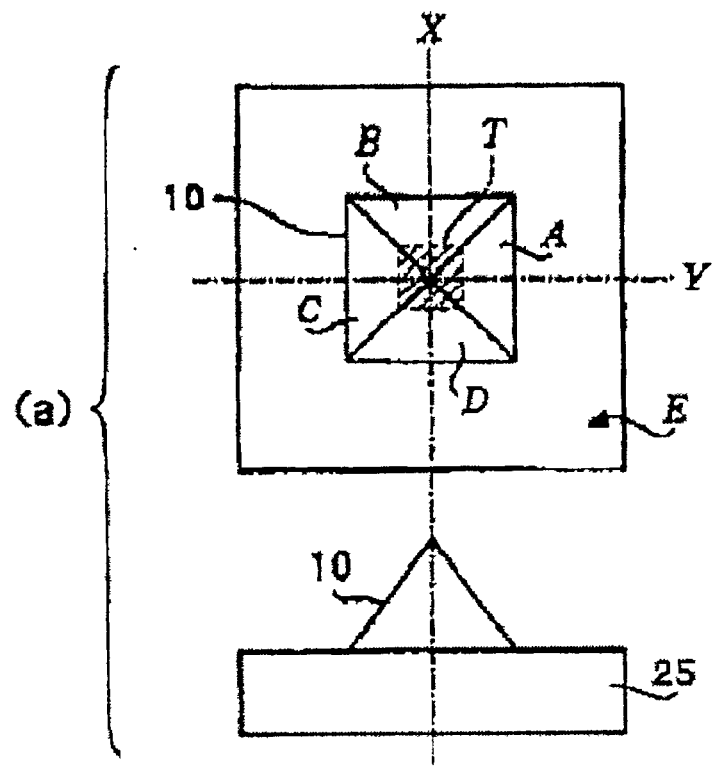
FIG. 15 is a figure for describing the convexities formed on the substrate for a liquid crystal device according to the present invention.
Figure 15:
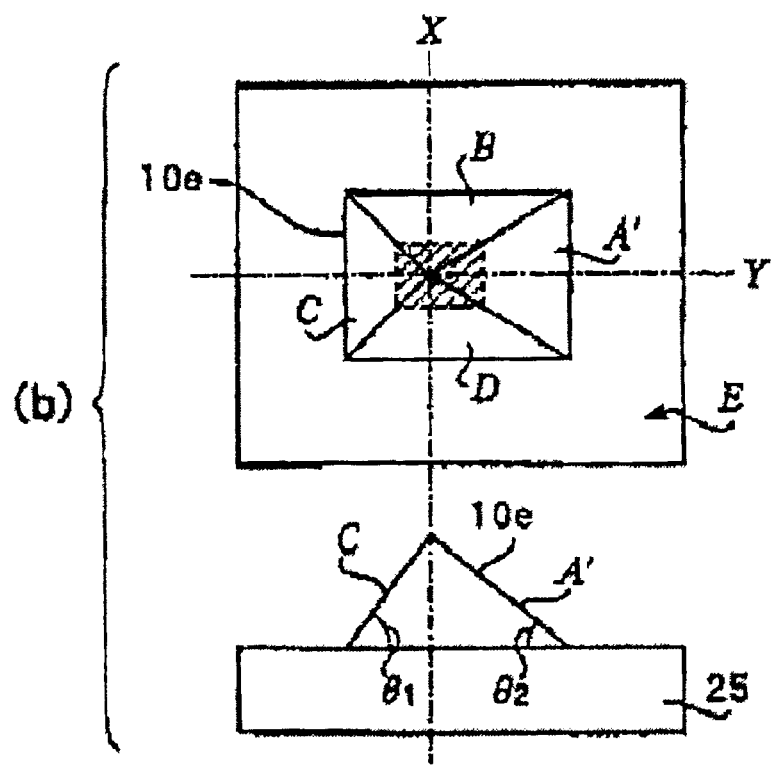
Figure 16:
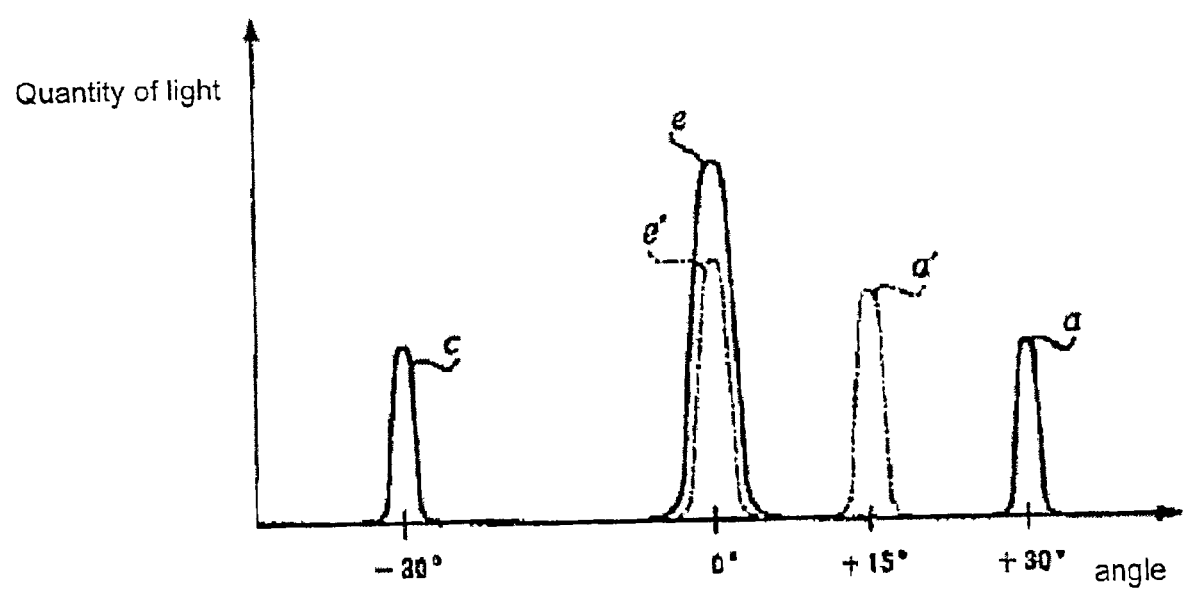
FIG. 16 is a graph showing an example of the quantity of reflected light distributed by a reflection pattern composed of the convexities shown in FIG. 15.
Figure 17:
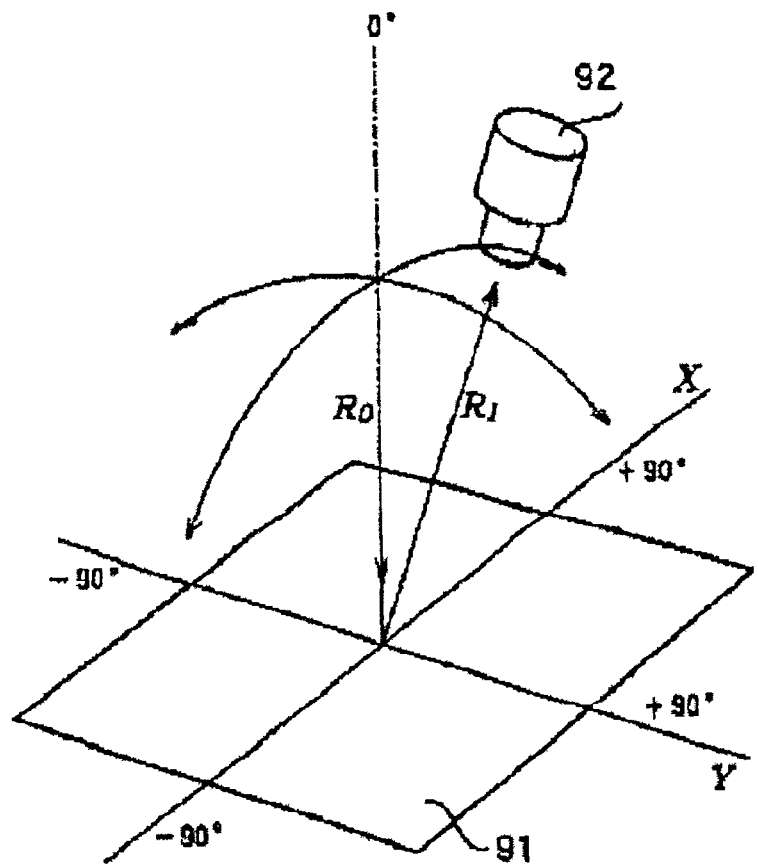
FIG. 17 is a perspective view showing an example of a measurement device for measuring the distribution of reflected light.
Figure 18:
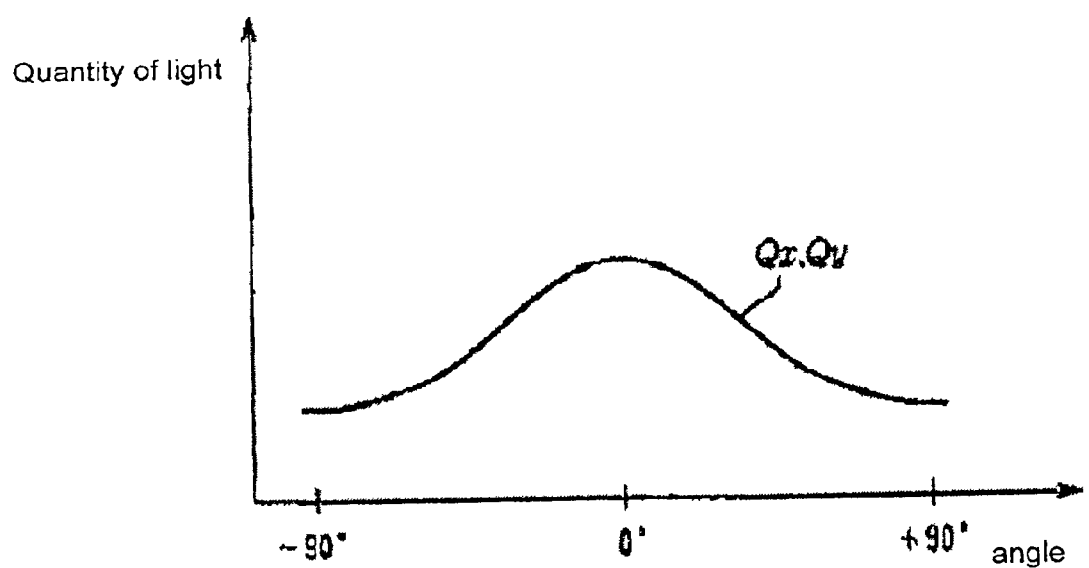
FIG. 18 is a graph showing an example of a conventional distribution of reflected light, that is obtained by employing the measurement device of FIG. 17.

In addition, in the above embodiment, the mask pattern 29 of FIG. 7 was employed to form the convexities 10*c* shown in FIG. 12(*c*) that are elliptical in cross section. However, a convexity 10*c* that is a rectangular dome shape in cross section as shown in FIG. 11(*a*), a rectangular pyramid shape in cross section as shown in FIG. 11(*b*), a teardrop shaped dome as shown in FIG. 12(*d*), an offset pyramid shape in cross section as shown in FIG. 15(*b*), or a shape in which the distribution of a quantity of light along two orthogonal axes is different as shown in FIG. 13, can be applied instead.

Figure 8:
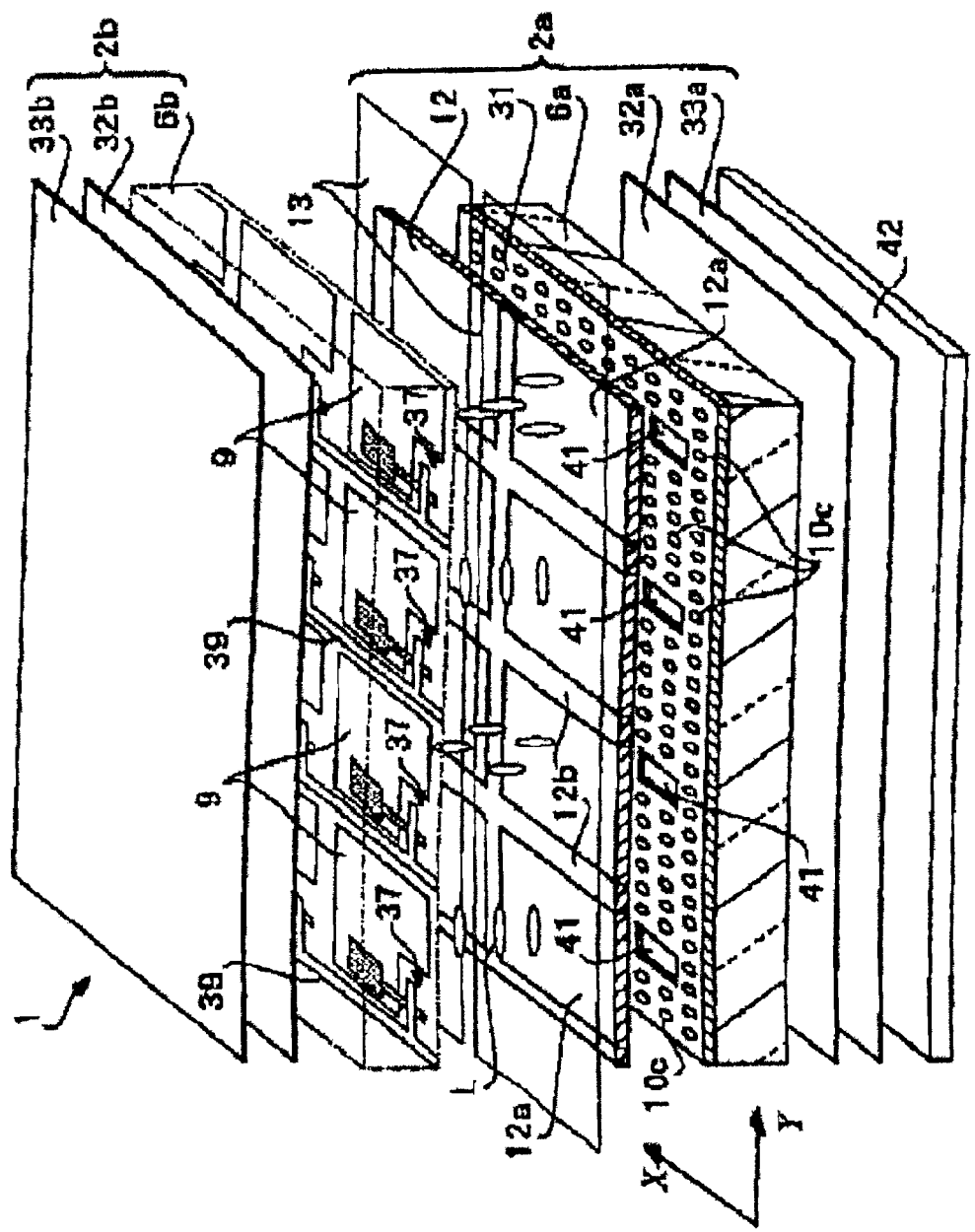
FIG. 8 is a perspective view showing the construction of the main components of another embodiment of a substrate for a liquid crystal device according to the present invention and a liquid crystal device that is constructed using this substrate for a liquid crystal device.

FIG. 8 shows the main components of another embodiment of a liquid crystal device according to the present invention that employs a substrate for a liquid crystal device according to the present invention, and in particular a number of enlarged display dot portions. The overall construction of this liquid crystal device can be established as shown in FIG. 3.

A liquid crystal display according to the present embodiment is an active matrix type of liquid crystal device that employs a TFD (Thin Film Diode), which is a two terminal type of active device, a semitransparent reflection type of liquid crystal device in which a reflection display that employs outside light such as natural light and the like, or a transparent display that employs a lighting device, selectively takes place, and is a COG (Chip On Glass) type of liquid crystal device in which ICs for driving the liquid crystal is directly mounted on the substrate.

In the present embodiment as well, in FIG. 3, the liquid crystal device 1 includes a first substrate 2*a* and a second substrate 2*b* that are attached together around the circumference thereof by means of a circular seal member 3. In addition, the liquid crystal device 1 is formed by enclosing liquid crystals in a gap, in other words a cell gap, formed by the first substrate 2*a*, the second substrate 2*b*, and the seal member 3. Further, in the present embodiment, ICs 4*a* and 4*b*, which drive the liquid crystal are mounted directly to the surface of the substrate 2*a*.

A plurality of pixel electrodes are formed and arranged in a dot matrix pattern of rows XX and columns YY inside the area of the second substrate 2*b* defined by the seal member 3. In addition, stripe electrodes are formed inside the area of the first substrate 2*a* defined by the seal member 3, and these stripe electrodes are disposed opposite the plurality of pixel electrodes on the second substrate 2*b*.

A portion of the liquid crystal interposed between one stripe electrode on the first substrate 2*a* and a pixel electrode on the second substrate 2*b* forms one display dot. A plurality of these display dots are formed in a display area V by arranging them in a dot matrix pattern inside the area defined by the seal member 3. ICs 4*a* and 4*b* for driving the liquid crystal control the orientation of the liquid crystal in each display dot by selectively applying a scanning signal and a data signal between the opposing electrodes that form the plurality of display dots. By controlling the orientation of this liquid crystal, the light that passes through the liquid crystal is modulated, and an image consisting of characters, numbers, and the like is displayed inside the display area V.

Figure 9:
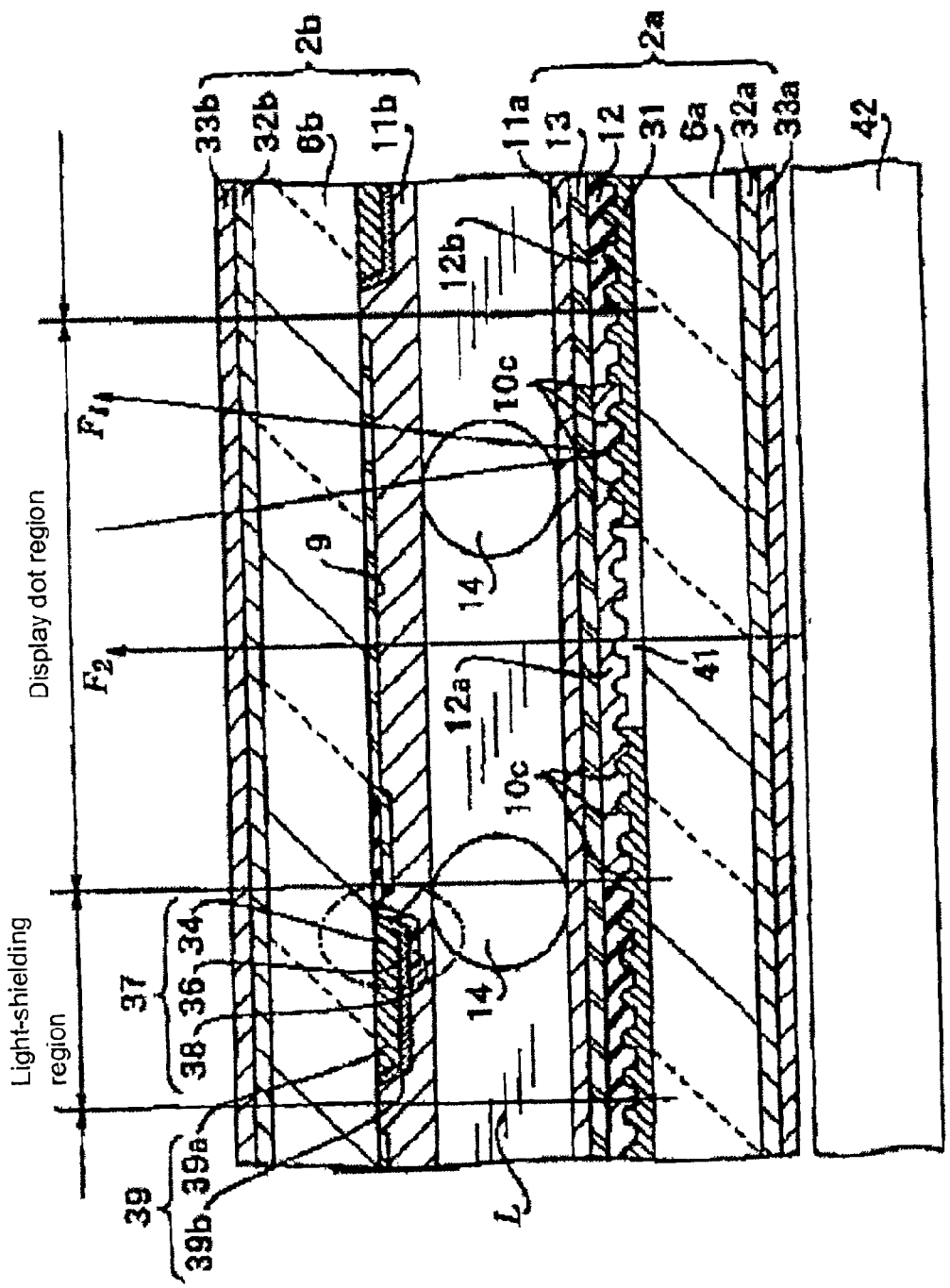
FIG. 9 is a cross sectional view showing a cross section of the main components of FIG. 8.

FIG. 8 shows enlarged cross sections of a number of display dot from amongst the plurality of display dots formed inside the display area V in the liquid crystal device 1. In addition, FIG. 9 shows a cross section of one of these display dots.

In FIG. 8, the first substrate 2*a* has a base 6*a* that is formed from glass, plastic or the like, a light-reflecting film 31 that is formed on the inner surface of the base 6*a*, a color filter 12 that is formed on top of the light reflecting film 31, and transparent stripe electrodes 13 formed on top of the color filter 12. As shown in FIG. 9, an alignment film 11*a* is formed on top of the stripe electrode 13, and with respect to this alignment film 11*a*, a rubbing process is performed as an alignment process. The stripe electrodes 13 are formed from transparent conductive materials such as ITO (Indium Tin Oxide) and the like.

The second substrate 2*b* that faces the first substrate 2*a* has a base 6*b* that is formed from glass, plastic, or the like, a TFD (Thin Film Diode) 37 that functions as a switching element and formed on the inner surface of the base 6*b*, and pixel electrodes 9 that are formed on the TFD 37. As shown in FIG. 9, the alignment film 11*b* is formed on top of the TFD 37 and the pixel electrodes, and a rubbing process is conducted for the alignment process with respect to this alignment film 11*b*. The pixel electrodes 9 are formed from a transparent conducting material such as, for example, ITO (Indium Tin Oxide) and the like.

The color filter 12 on the first substrate 2*a* has a filter element 12*a* in the position facing the pixel electrodes 9 on the second substrate 2*b* that is either R (red), G (green) and B (blue), or C (cyan), M (magenta) and Y (yellow), and a black mask 12*b* in a position that does not face the pixel electrodes 9.

In FIG. 9, the width of the gap between the first substrate 2*a* and the second substrate 2*b*, in other words the cell gap, is maintained by means of spherical spacers 14 dispersed on the surface of either one of the substrates. The liquid crystal L is enclosed inside this cell gap.

Figure 10:
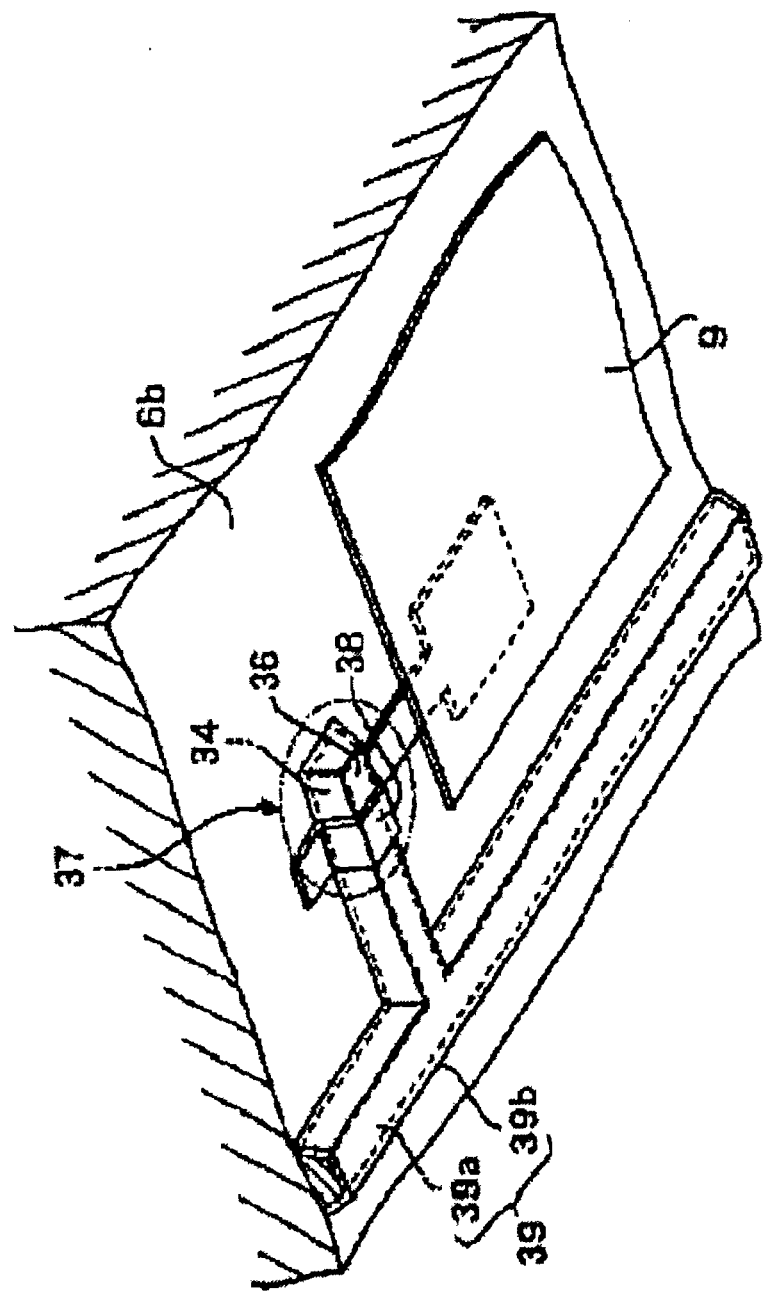
FIG. 10 is a perspective view showing a TFD element that is an example of an active element employed by the liquid crystal device of FIG. 8.

As shown in FIGS. 9 and 10, TFD 37 is constructed such that it has a first metallic layer 34, an insulating layer 36 formed on the surface of the first metallic layer 34, and a second metallic layer 38 formed on top of the insulating layer 36. This type of TFD 37 is constructed such that it has a layered structure comprised of a first metallic layer/an insulating layer/and a second metallic layer, that is to say an MIM (Metal Insulator Metal) structure.

The first metallic layer 34 is formed, for example from elemental tantalum, a tantalum alloy, and the like. In the event that a tantalum alloy is employed for the first metallic layer 34, an element in the sixth to eighth group of the periodic table is added to the main component tantalum, for example, tungsten, chrome, molybdenum, rhenium, yttrium, lanthanum, dysprosium, and the like.

The first metallic layer 34 is formed integrally with a first layer 39*a* of line wires 39. These line wires 39 are formed into stripes sandwiching the pixel electrodes 9, and are used for scanning lines which supply scanning signals to the pixel electrodes 9 or for data lines which supply data signals to the pixel electrodes 9.

The insulating layer 36 is constructed such that tantalum oxide ($Ta_2O_3$) is formed by oxidizing the surface of the first metallic layer 34 by the anodic oxidation method. In addition, when the first metallic layer 34 is subject to anodic oxidation, the surface of the first layer 39a of the line wires 39 is oxidized at the same time, and a second layer 39b comprised of tantalum oxide is likewise formed.

The second metallic layer 38 is formed from conducting materials such as, for example, Cr and the like. The pixel electrodes 9 are formed on the surface of the base 6b such that parts thereof lie on the edges of the second metallic layer 38. In addition, there are times when a foundation layer of tantalum oxide and the like is formed on the surface of the base 6b before forming the first metallic layer 34 and first layer 39a of the line wires. This is in order to prevent the first metallic layer 34 from peeling off of the foundation due to the heat treatment after deposition of the second metallic layer 38, and in order to prevent impurities from diffusing into the first metallic layer 34.

In FIG. 8, a phase difference plate 32a is adhered to the outer surface of the base 6a, and a polarizing plate 33a is adhered to the top of the phase difference plate 32a. In addition, a phase difference plate 32b is adhered to the outer surface of the base 6b, and a polarizing plate 33b is adhered to the top of the phase difference plate 32b.

For example, when an STN (Super Twisted Nematic) liquid crystal is employed, there are times when a wavelength dispersion is generated in the light that passes through this liquid crystal and generates coloring in the display image. The phase difference plates 32a and 32b are optically anisotropic objects that are employed to eliminate this kind of coloring, and for example can be constructed from a film formed by uniaxially drawing a resin such as polyvinyl alcohol, polyester, polyetheramide, polyethylene, and the like.

The polarizing plates 33a and 33b are film type optical components that function to take in natural light and unidirectionally emit linearly polarized light. For example, a polarizing layer can be formed by interposing a protective layer of TAC (cellulose triacetate). The polarizing plates 33a and 33b are normally disposed so that their transmission polarizing axes are offset from each other.

The light reflecting layer 31 is formed from a metal that has the ability to reflect light such as, for example, aluminum, and ports 41 for transmitting light are formed therein in positions opposite each pixel electrode 9 attached to the second substrate 2b, i.e., in positions opposite each display dot. In addition, elliptical dome shaped convexities 10c shown in FIG. 12(c), for example, are formed on the liquid crystal surface side of the light reflecting film 31 such that they are arranged in minute regular intervals, and in the present embodiment, are formed in a regular matrix pattern.

The aforementioned convexities 10c are arranged such that their major axes extend along the X axis and the direction of the line wires 39, and their minor axes extend along an orthogonal Y axis. In addition, in FIG. 3, the major axis direction X is parallel with the edges that extend in the direction XX of base 6a, and the minor axis direction Y is parallel with the edges that extend in the direction YY of the base 6a.

Because the liquid crystal device 1 of the present embodiment is constructed as described above, when the liquid crystal device 1 is used for a reflection type of display, in FIG. 8, external light that enters the interior of the liquid crystal device 1 from the viewing side, i.e., the second substrate 2b side, passes through the liquid crystal L, arrives at the light reflecting film 31, reflects off of the light reflecting film 31, and is again supplied to the liquid crystal L (see the arrow $F_1$ in FIG. 9). The orientation of the liquid crystal L is controlled by each display dot by means of a voltage applied between the pixel electrodes 9 and the opposing strip electrodes 13, in other words, a scanning signal and a data signal. Because of this, the reflected light that is supplied to the liquid crystal L is modulated for each display dot, and because of this, an image composed of characters, numbers, and the like is displayed to the viewer.

On the other hand, when the liquid crystal device 1 is used for a transmission type of display, a lighting device disposed on the outer side of the first substrate 2a, in other words a backlight 42, generates light, and this generated light is supplied to the liquid crystal L after it passes through the polarizing plate 33a, the phase difference plate 32a, the base 6a, the ports 41 in the light reflecting film 31, the color filter 12, the electrodes 13 and the alignment film 11a (see the arrow $F_2$ in FIG. 9). After this, a display takes place in the same manner as with the reflection type of display.

In the present embodiment, because the reflecting pattern is formed to be a regularly arranged plurality of convexities 10c on the surface of a reflecting film 31, and the spatial shape of the plurality of convexities 10c along the X axis are different from the spatial shape along the Y axis, the quantity of light reflected to a particular viewing direction can be suppressed to a low level, and the quantity of light reflected to another certain viewing direction can be increased. As a result, when the reflecting film 31 is employed in a reflection type of display, the image that is displayed in the display area V of the liquid crystal device 1 to a viewer can be exceptionally bright in a certain viewing direction.

The liquid crystal device 1 of the present embodiment can be manufactured by the method of manufacturing shown in FIG. 4 and described previously. In addition, conventional methods of forming the first substrate 2a and the second substrate 2b can also be applied. Moreover, in FIG. 8, when the light reflecting film 31 is formed on the surface of the first substrate 2a, and ports 41 and the convexities 10c serving as a reflecting pattern are formed on the light reflecting film, for example, a photolithography process can be applied that employs the mask 28 in which the mask pattern 29 of elliptical shapes is arranged in a dot matrix style.

In addition, in the aforementioned embodiment, the mask pattern 29 of FIG. 7 was employed to form the convexities 10c shown in FIG. 12(c) that are elliptical in cross section. However, a convexity 10c that is a rectangular dome shape in plane cross section as shown in FIG. 11(a), a rectangular pyramid shape in plane cross section as shown in FIG. 11(b), a teardrop shaped dome as shown in FIG. 12(d), an offset pyramid shape in cross section as shown in FIG. 15(b), or a shape in which the distribution of a quantity of light along two orthogonal axes is different as shown in FIG. 13, can be applied instead.

Figure 25:
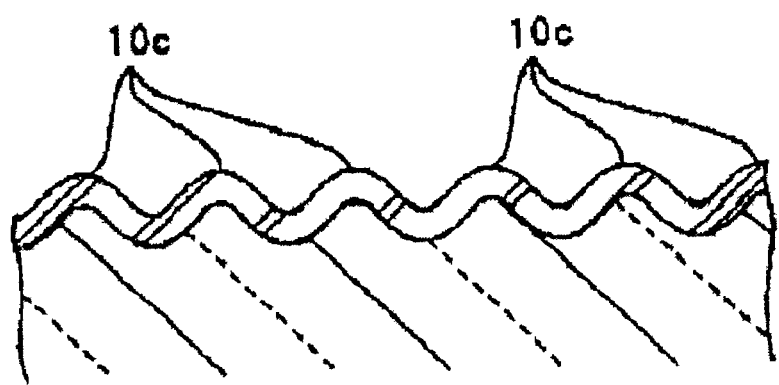
FIG. 25 is a cross sectional view showing the pattern of convexities formed on an actual surface of a light reflecting surface.

In addition, with regard to the surface condition of the pixel electrode 9 that is used as a light reflecting film, in the embodiment shown in FIG. 1, there is a distinct flat portion that is formed in between the adjoining convexities 10c. In addition, with regard to the surface condition of the light reflecting film 31, in the embodiment shown in FIG. 9, there is a distinct flat portion that is formed in between the adjoining convexities 10c. However, in the actual convexity forming process, this type of distinct flat portion is rarely formed. In many cases, as shown in FIG. 25, it is thought that a curved shape is formed in between the convexities 10c and that there are no flat portions. As with the present invention, when one tries to achieve light directivity and light scattering by means of a light reflecting film, particularly light scattering, it is thought to be more preferable to have curved shapes in between the convexities as described above, rather than distinct flat surfaces in between the convexities. This is because with flat surfaces, the degree of light scattering is low due to the presence of a mirror reflection.

In the liquid crystal device 1 shown in FIG. 1, a pattern of a plurality of convexities, such as the convexities 10c shown in FIG. 12(c), are formed and arranged on the pixel electrode 9 that is used as a light reflecting film, and this pattern serves to provide light directivity and light scattering. In addition, in the liquid crystal device 1 shown in FIG. 8, a pattern of a plurality of these types of convexities are formed and arranged on the light reflecting film 31a, and this pattern serves to provide light directivity and light scattering.

However, in the substrate for a liquid crystal device according to the present invention, the liquid crystal device, the electronic apparatus, and the method of manufacturing these, rather than forming a pattern of a plurality of arranged convexities in order to provide light directivity and light scattering, a pattern of a plurality of arranged concavities can be formed on the light reflecting film in order to provide light directivity and light scattering.

Figure 21:
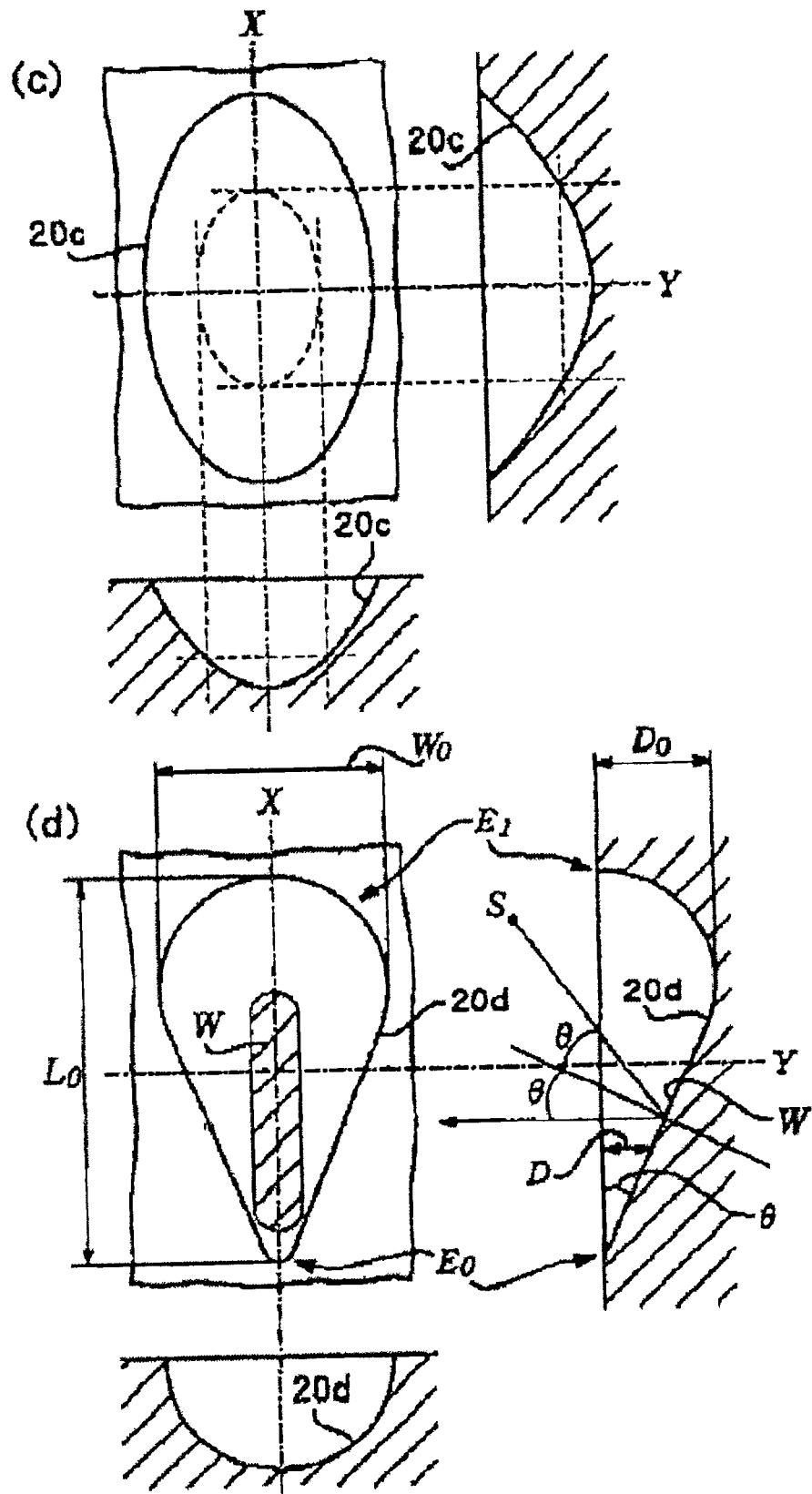
FIG. 21 is a figure showing another example of concavities formed in the surface of a light reflecting film.
Figure 22:
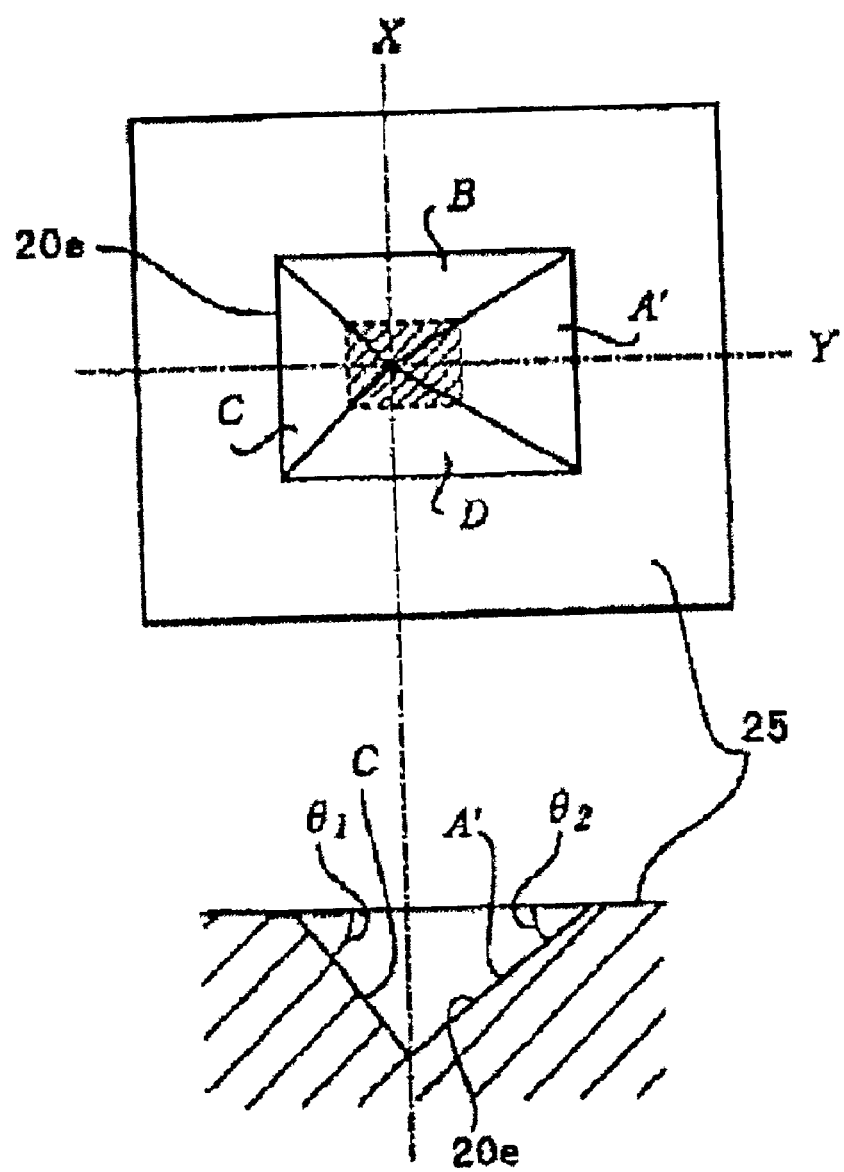
FIG. 22 is a figure showing yet another example of concavities formed in the surface of a light reflecting film.

Specifically, for example, a pattern that provides light directivity and light scattering can be formed by arranging a plurality of concavities, such as a dome shaped concavity 20a that is rectangular in plane section as shown in FIG. 20(a), a pyramid shaped concavity 20b that is rectangular in plane section as shown in FIG. 20(b), a dome shaped concavity 20c that is elliptical in plane section as shown in FIG. 21(c), a teardrop shaped concavity 20d as shown in FIG. 21(d), a pyramid shaped concavity 21e that is elongated along the Y axis and rectangular in plane section as shown in FIG. 22, and a concavity in which the distribution of light along two orthogonal axes is different as shown in FIG. 13.

Figure 20:
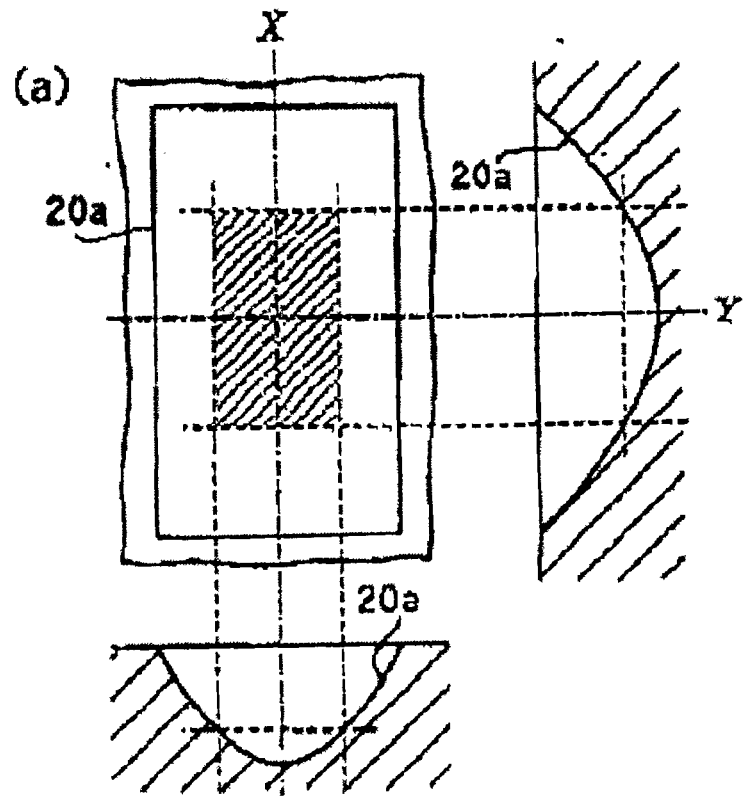
FIG. 20 is a figure showing an example of concavities formed in the surface of a light reflecting film.
Figure 20:
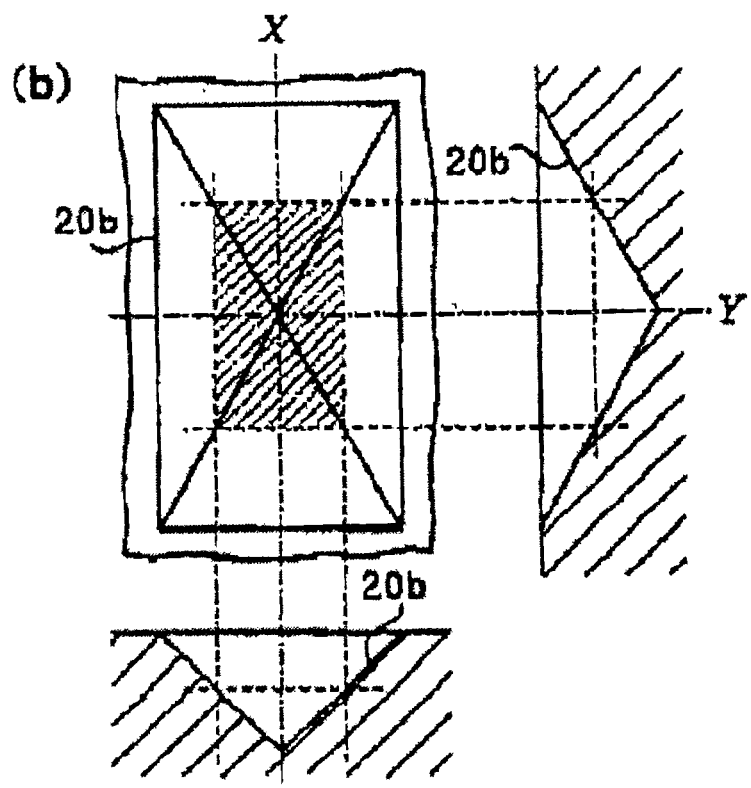

In addition, in FIGS. 20, 21 and 22, as with the convexities 10a shown in FIG. 11 and the like, it is preferable that the X axis and the Y axis are aligned in the XX and YY directions, respectively in FIG. 3.

In addition, the teardrop shaped concavity 20d shown in FIG. 21(d) has a planar shape in which the pointed end $E_0$ and the gently rounded end $E_1$ are connected by approximately straight lines, and is a shape in which the size D, in this case the concavity depth D, of the cross-section thereof gradually becomes larger from the pointed end $E_0$ to the gently rounded end $E_1$.

With regard to this teardrop shaped concavity 20d, in an area W that exists between the first edge $E_0$ and the second edge $E_1$, light from a light source S has the inclination to be reflected at an angle $2\theta$. This is a large factor in determining the light directivity of the light reflecting film. Thus, $\theta$ in this case is, in other words, the angle of inclination $\theta$ between the first edge $E_0$ and the second edge $E_1$.

The effect of the above is that when one considers exterior light such as sunlight, indoor light, and the like, and the position of the viewer's eyes at the light previously reflected at a reflection angle $2\theta$ (the normal direction of the panel display surface), it is thought that when the viewer sees the display surface of the liquid crystal device by means of external light, the display provided is excellent and is the most efficient, and a bright clear image can be seen by the viewer.

At present, with portable telephones and other electronic apparatuses, when one considers the aforementioned angle of inclination $2\theta$ between the external light and the viewing angle, it is thought that $2\theta=15$ degrees is a practical angle. In order to achieve this type of $2\theta$ angle, the angle of inclination $\theta$ between the first edge $E_0$ and the second edge $E_1$ of the concavity 20d need to be set at $\theta=15$ degrees/2=7.5 degrees. In addition, according to experiments conducted by the inventor(s), regarding the teardrop shaped concavity 20d, when the depth $D_0$ thereof is approximately 1 micron, the width $W_0$ is approximately 9 microns, and the length $L_0$ is approximately 14 microns, the desired light directivity and light scattering can be obtained. Moreover, concavity 20d and the like are generally formed by a patterning method such as photolithography. Regarding the depth $D_0$ and the like, it is not possible to construct all concavities 20d with exactly the same size, and producing irregular sizes cannot be avoided.

Figure 24:
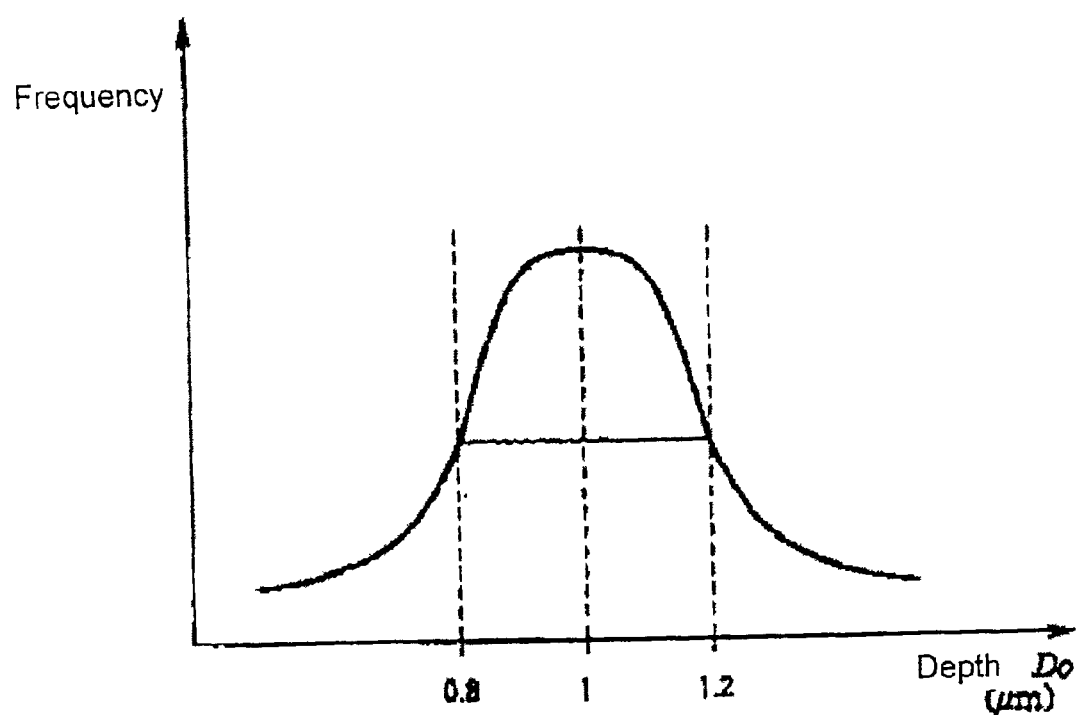
FIG. 24 is a distribution chart showing the distribution of the height of convexities and the depth of concavities formed on the surface of a light reflecting film.

The inventor(s) have made observations with respect to this point. As shown in FIG. 24, when one tries to obtain the goal of a depth $D_0$ of 1 micron, a normal distribution of between 0.8 and 1.2 microns is obtained at the half width point. In other words, even when the goal for the depth of the concavity 20d is 1 micron, the depth of 60 to 80% of the concavities formed are $D_0=0.8$ microns to 1.2 microns. Moreover, the depth of 20 to 40 percent of the concavities formed are outside the size of $D_0=0.8$ microns to 1.2 microns. Even when this kind of irregularity exists in the size, it has been confirmed that excellent light directivity and light scattering from the light reflecting film can be obtained.

Figure 23:
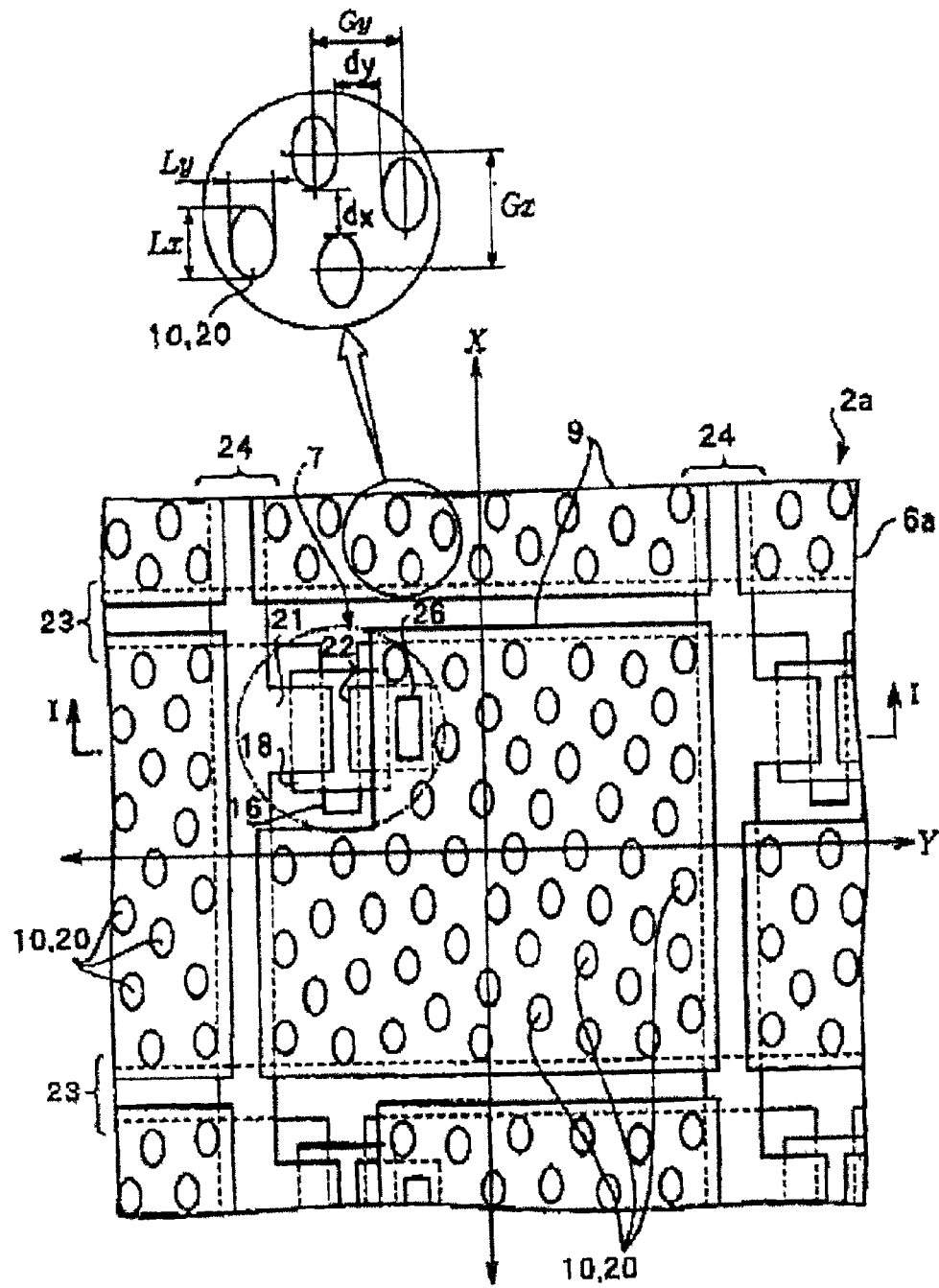
FIG. 23 is a plan view showing the main components of a planar structure of another embodiment of the substrate for a liquid crystal device according to the present invention.

FIG. 23 shows the main components of another embodiment of a liquid crystal device according to the present invention, and shows a construction that corresponds to that previously described in FIG. 2. In the present embodiment shown here, there is a pattern having light directivity and light scattering abilities. The plurality of convexities 10 or concavities 20 are not regularly arranged within a plane, but rather are randomly arranged. In addition, as with the embodiment shown in FIG. 2, the direction in which each convexity 10 or concavity 20 extends is the same with all of the convexities and concavities.

As shown in FIG. 2, when a plurality of convexities or concavities are regularly arranged in a matrix shape, there is a danger that undesirable optical phenomena such as optical interference will be generated. With regard to this, as in the present embodiment, if a reflection pattern is made up of convexities or concavities and the like that are randomly arranged within a plane, undesirable optical phenomena induced by the regularity of a reflection pattern can be avoided.

In addition, when a gap $G_x$ exists between adjacent convexities 10 or concavities 20 in the X direction, and the convexities 10 or concavities 20 in the X direction have a length $L_x$, then $L_x$ is less than or equal to $G_x$, and $G_x$ is less than or equal to $L_x+alpha_x$, where $a<alpha_x<b$. Moreover, when a gap $G_y$ exists between adjacent convexities 10 or concavities 20 in the Y direction, and the convexities 10 or concavities 20 in the Y direction have a length $L_y$, then $L_y$ is less than or equal to $G_y$, and $G_y$ is less than or equal to $L_y+alpha_y$, where $a<alpha_y<b$.

Here, "a" is the distance, approximately 2 microns, at which the patterns can maintain a pattern shape while being as close as possible to each other. If this distance becomes any shorter, the gap between the adjacent convexities 10 or concavities 20 is too narrow, damaging the shape of the concavities, and is insufficient to achieve light directivity and light scattering. On the other hand, "b" is the maximum distance, approximately 10 microns, that can separate the patterns. When it is any longer than this, because the gap between the adjacent convexities 10 or concavities 20 becomes too wide and a large number of flat portions develop, it is insufficient to achieve light directivity and light scattering. With regard to this, if the size of $G_x$ and $G_y$ is as described above, none of these concerns will exist.

Figure 26:
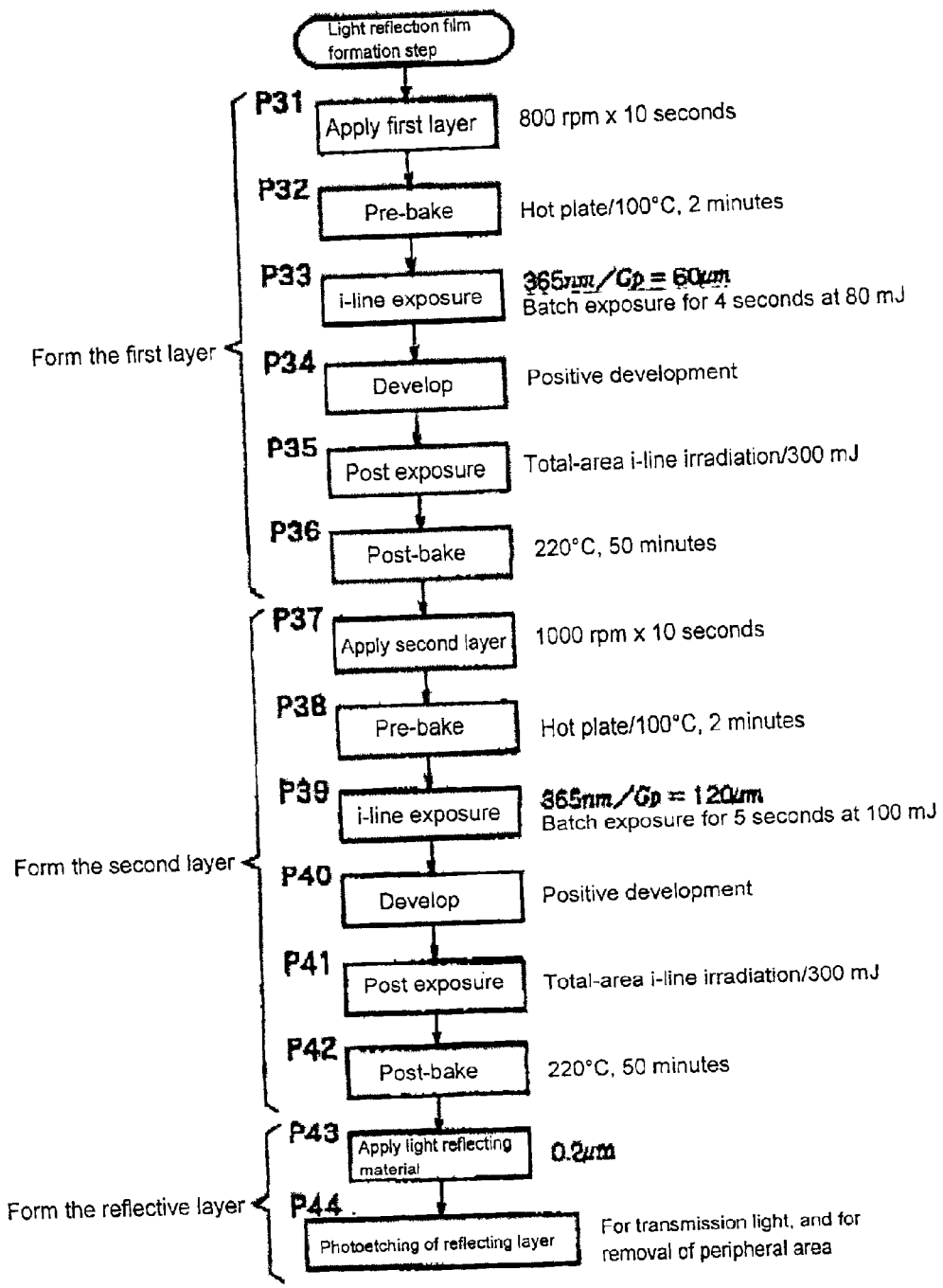
FIG. 26 is a flowchart showing another embodiment of a method of manufacturing a substrate for a liquid crystal device according to the present invention.

FIG. 26 shows the main steps of another embodiment of a method of manufacturing a substrate for a liquid crystal device according to the present invention. In particular, FIG. 26 shows an embodiment of a method of forming a light reflecting film comprising concavities on a base 6a composed of plastic and the like as shown in FIG. 9.

Figure 27:
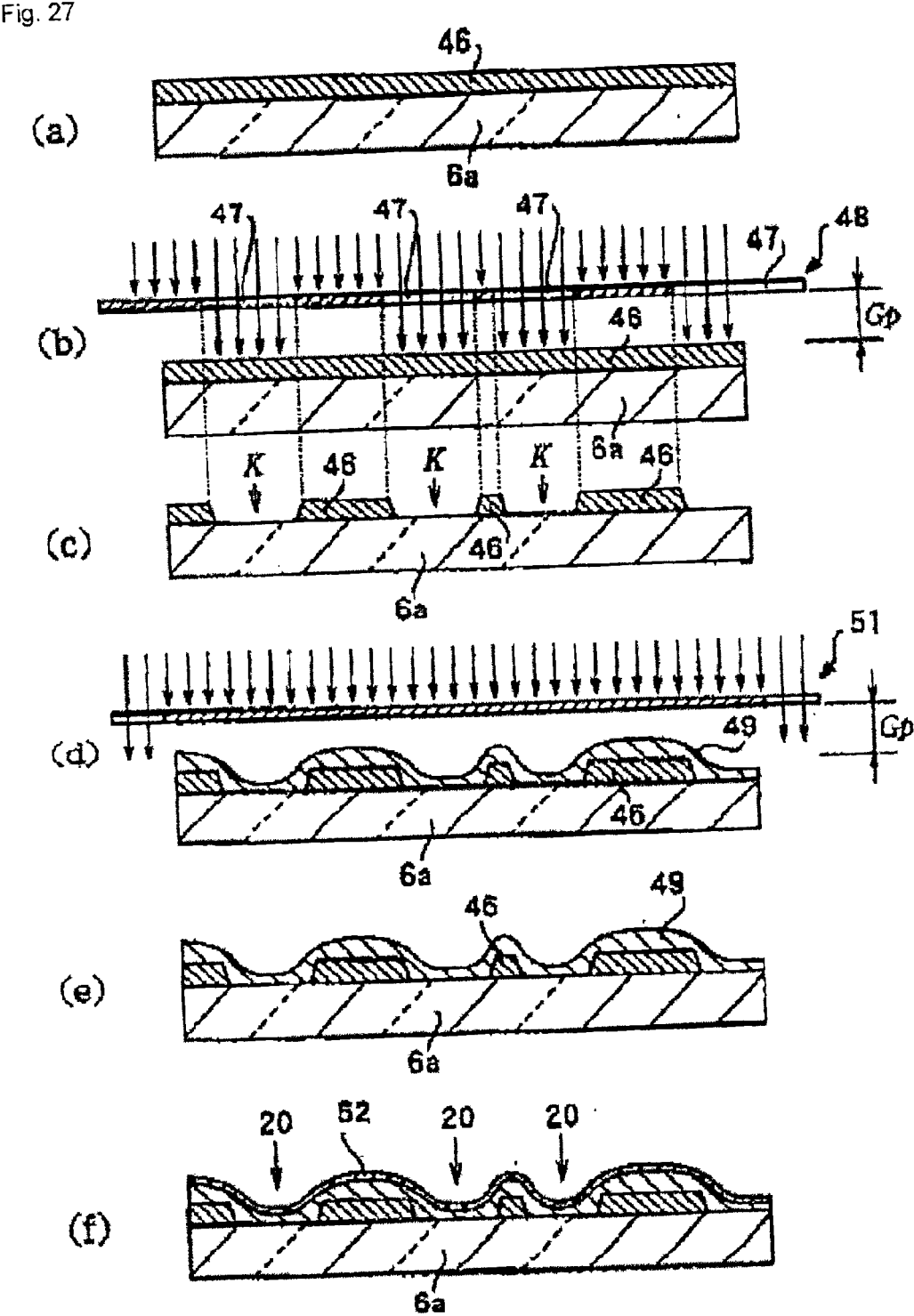
FIG. 27 is a figure showing the process of forming the light reflecting film corresponding to the flow chart in FIG. 26.

In the steps for forming a light reflecting film that are shown here are, first, in step P31 of FIG. 26 and FIG. 27(a), a first layer 46 is applied in a uniform thickness on a base 6a composed of glass and the like. For example, an acrylic resin with a coefficient of viscosity of 9 cp is applied to a thickness of 1.6 microns by spin coating at 800 rpm for 10 seconds.

Next, in step P32 pre-bake takes place and the first layer is fixed. For example, pre-bake takes place on a hot plate at 100 degrees Celsius for two minutes. Next, in step P33 and FIG. 27(b), the first layer 46 is exposed to i-line (i.e., light at a wavelength of 365 nm) through a mask 48 that forms a mask pattern 47 that corresponds to the target concavities. At this time, the distance between the mask 48 and the first layer 46, i.e., the proximity gap $G_p$=60 microns. Further, the total quantity of i-line exposure is 80 mJ for 4 seconds.

The acrylic resin that forms the first layer 46 is a positive photosensitive resin, and due to the aforementioned exposure, the portions on the first layer 46 that are covered by the mask pattern 47 can be dissolved. Next, in step P34, the first layer 46 is patterned as shown in FIG. 27(c) through a developing process. Due to this patterning, the areas K that from the first layer 46 has been removed will later become the concavities in the light reflecting film.

Next, in step P35 the color of the acrylic resin that forms the first layer 46 is eliminated by post exposure, i.e., irradiating the entire surface with 300 mJ of i-line for a short period of time. Afterward, in step P36, the first layer 46 is hardened by conducting a post-bake, for example, heating it at 220 degrees Celsius for 50 minutes.

Next, in step P37 and FIG. 27(d), a second layer 49 is uniformly applied on top of the first layer 46. This second layer 49 is, for example, formed to a thickness of 1.3 microns with the same acrylic resin as the first layer 46 by spin coating at 1000 rpm for 10 seconds.

Next, in step P38, a pre-bake takes place, and the second layer is fixed. For example, the pre-bake takes place on a hot plate at 100 degrees Celsius for two minutes. Next, in step P39 and FIG. 27(d), the second layer 49 is exposed to i-line (in other words, light at a wavelength of 365 nm) through a mask 51 through which openings have been formed around the periphery thereof. At this time, the distance between the mask 48 and the second layer 49, in other words the proximity gap $G_p$, is $G_p$=120 microns. In addition, the total quantity of i-line exposure is 100 mJ for 5 seconds. This exposure removes the second layer 49 on the periphery in order to mount the driver ICs.

The proximity gap $G_p$ of the i-line exposure during the formation of the second layer is $G_p$=120 microns. On the other hand, the proximity gap $G_p$ of the i-line exposure during the formation of the first layer is $G_p$=60 microns. In other words, the proximity gap $G_p$ of the i-line exposure during the formation of concavities on the first layer is set to be smaller than the proximity gap $G_p$ of the i-line exposure during the peripheral exposure on the second layer.

In principle, the smaller the proximity gap $G_p$ is the more accurately the pattern can be formed. However, there is a limit with respect to how small the proximity gap $G_p$ can be, because when the proximity gap $G_p$ is too small, there is a danger that when there is foreign substances in between the mask and the exposure target, the mask and the like can be damaged by these substances.

For the reasons above, in the present embodiment, the proximity gap $G_p$ is set to be as small as possible when exposure of the first layer 46 takes place for the foundation of the concavities, 60 microns in the present embodiment, and the proximity gap $G_p$ is set to be as large as possible, 120 microns in the present embodiment, when exposure of the second layer takes place because a high decree of accuracy is not necessary.

Next, in step P40, by conducting a developing process and removing the second layer 49 on the periphery of the base 6a, as shown in FIG. 27(e), sunken portions opposite the concavities in the second layer 49 can be obtained. Next, in step P41, the color of the acrylic resin that forms the second layer 49 is eliminated by post exposure, i.e., irradiating the entire surface with 300 mJ of i-line for a short period of time. Afterward, in step P42, the second layer 49 is hardened by conducting a post-bake, for example, heating it at 220 degrees Celsius for 50 minutes.

Afterward, in step P43, a reflective film material, for example Al (aluminum) is deposited in a uniform thickness of around 0.2 microns by, for example, sputtering. In addition, in step P44, a photo etching process takes place, and in FIG. 27(f), this forms a reflecting film 52 with a predetermined pattern. Patterning is performed at this time in order to form ports for optical transmission when a backlight in a liquid crystal device is employed in the transmission display method, and to mount electronic components and the like on the periphery of the liquid crystal panel.

Figure 28:
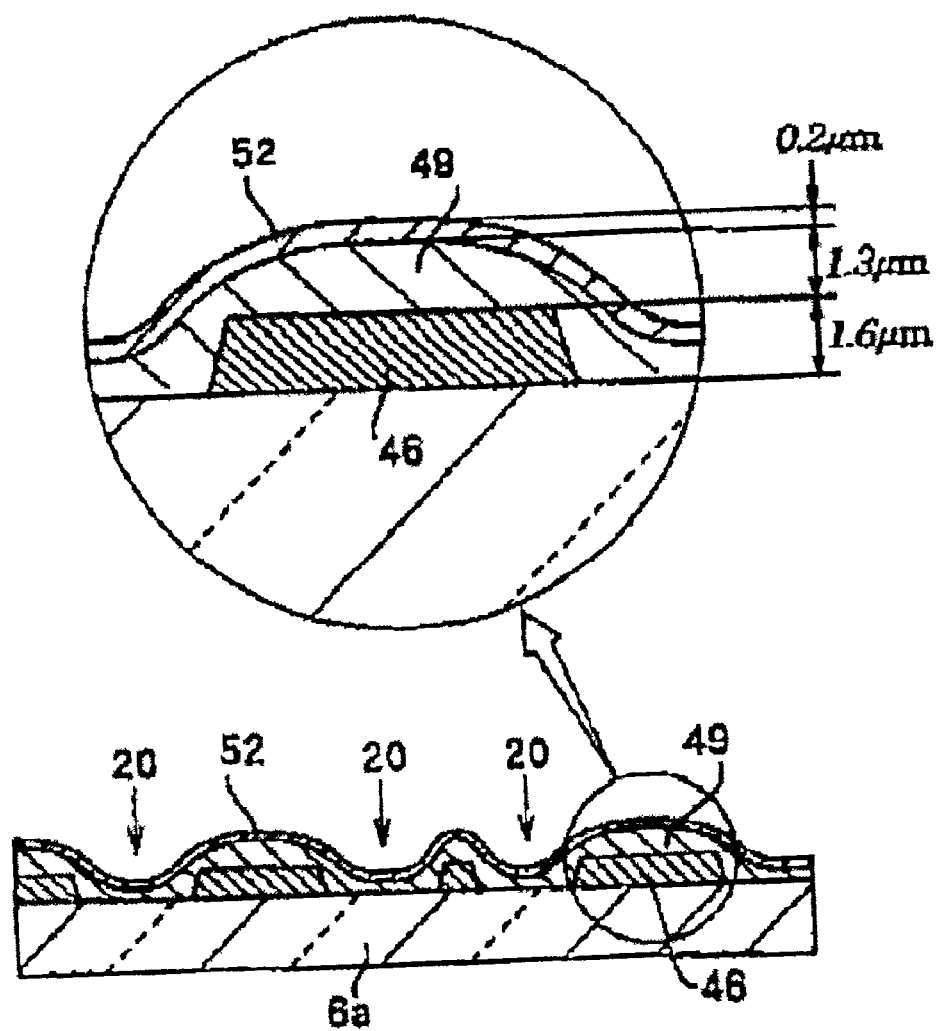
FIG. 28 is a cross sectional view showing a cross section of an example of a completed light reflecting film.

Due to the above, as shown in FIG. 28, the concavities 20 are formed, for example, in a randomly arranged state on the reflection film 52. In the present embodiment, if a double layered structure composed of the first layer 46 and a second layer 49 form the foundation layers of the reflection film 52, the area in between the concavities 20 can be formed to be curved with no flat portions, or rough. This prevents the generation of a mirror reflection on the reflecting film 52, and can accurately produce the desired light scattering.

In addition, in the above explanation, in the semitransparent reflection type of the liquid crystal device shown in FIG. 9, a situation was illustrated in which a substrate had switching elements formed thereon and a reflection film was formed on the reflection side of the other substrate. However, the formation step of the reflection film shown in FIG. 26 can, of course, be applied to a situation like the liquid crystal device shown in FIG. 1, in other words, a situation in which switching elements are formed on a substrate and a reflection film is formed on top of that same substrate. However, in the situation in which the light reflecting film is formed as shown in FIG. 1, a separate process is necessary in order to form the contact holes 26.

Figure 29:
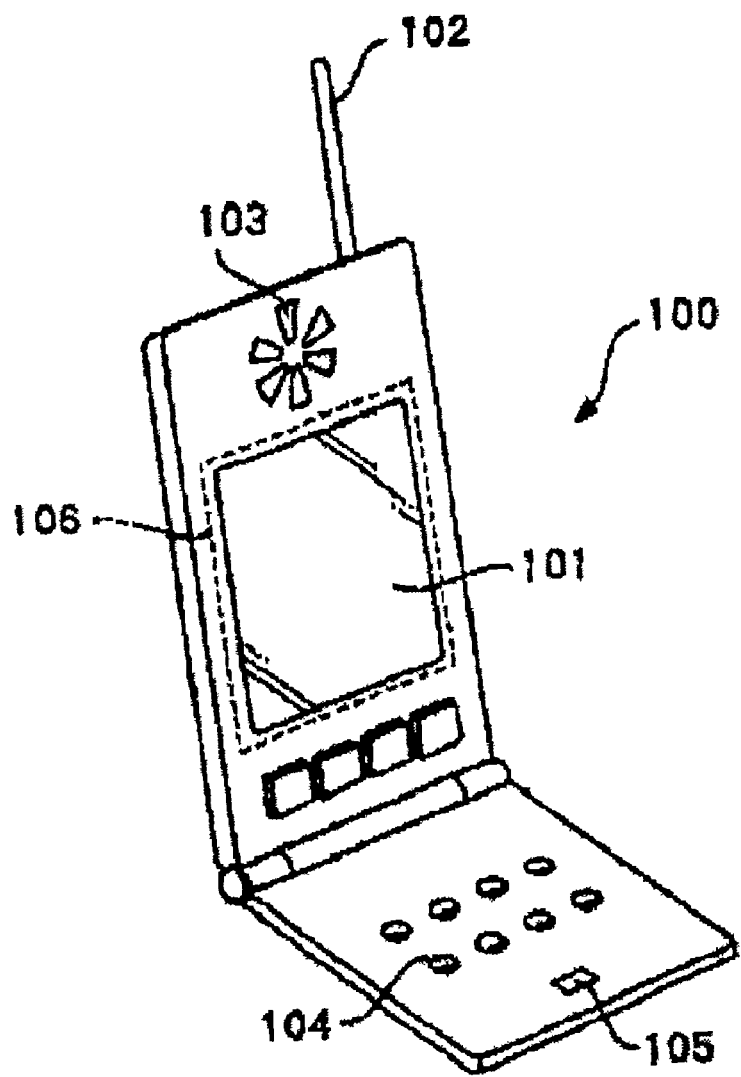
FIG. 29 is a perspective view showing an embodiment of an electronic apparatus according to the present invention.

FIG. 29 shows an embodiment of a portable telephone that is an example of an electronic apparatus according to the present invention. This portable telephone 100 has a liquid crystal device 101 for a display, an antenna 102, a speaker 103, a group of key switches 104, and a microphone 105.

The liquid crystal device 101 is contained in a decorative case, is controlled by means of a control circuit 106 provided in the interior of the decorative case, and displays the details of telephone communications, Internet information, and the like. This liquid crystal device 101 can be constructed, using, for example, the liquid crystal device 1 shown in FIG. 3.

Figure 30:
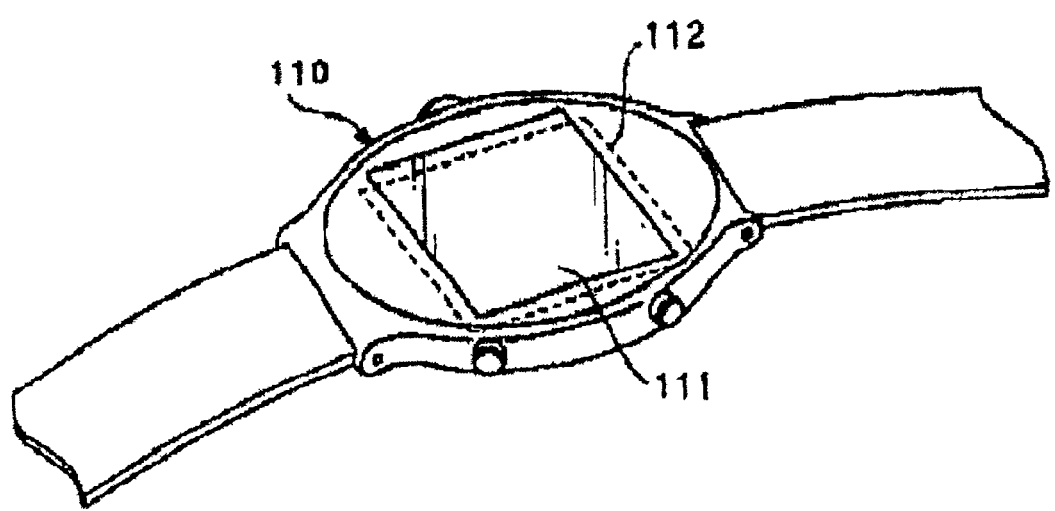
FIG. 30 is a perspective view showing an embodiment of another electronic apparatus according to the present invention.

FIG. 30 shows an embodiment of a wrist watch that is an example of an electronic apparatus according to the present invention. This wrist watch 110 has a liquid crystal device 111 for a display. This liquid crystal device 111 is contained in a decorative case, is controlled by means of a control circuit 112 provided in the interior of the decorative case, and displays information such as the time, date, and the like. This liquid crystal device 111 can be constructed, using, for example, the liquid crystal device 1 shown in FIG. 3.

Figure 31:
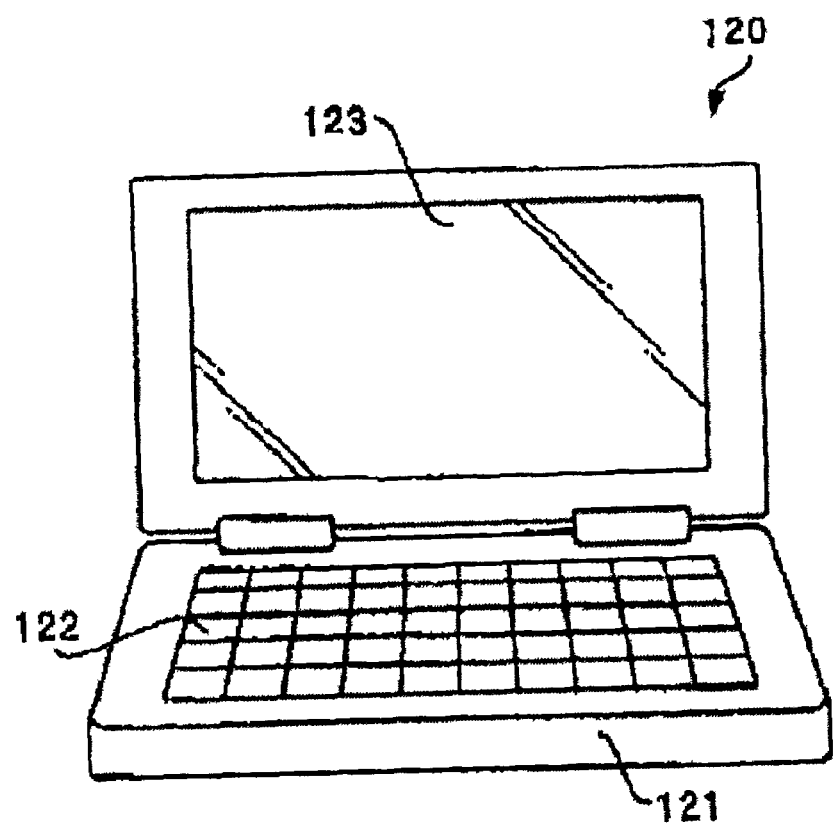
FIG. 31 is a perspective view showing an embodiment of yet another electronic apparatus according to the present invention.
Figure 32:
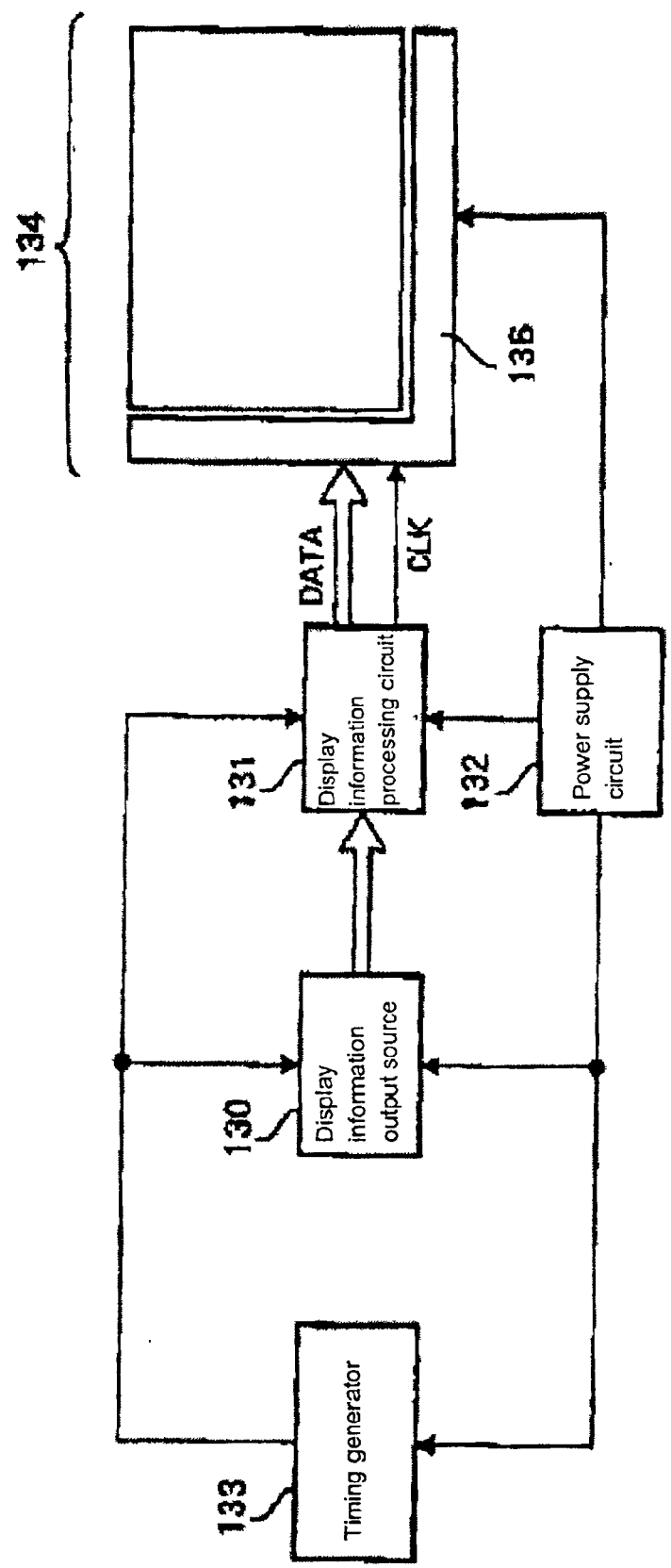
FIG. 32 is a block diagram showing the electronic control system of still another embodiment of an electronic apparatus according to the present invention.

FIG. 31 shows an embodiment of a portable information processing device that is an example of an electronic apparatus according to the present invention. This portable information processing device 120 is, for example, a word processor, a personal computer, or the like. The portable information processing device 120 shown here has an input device 122 such as a keyboard that is provided on the surface of the main body 121, and a liquid crystal device 121 for a display. Information input via the keyboard 122, and any results of arithmetic processing based on this information is displayed on the liquid crystal device 123. FIG. 32 shows another embodiment of an electronic apparatus according to the present invention. The electronic apparatus shown here is constructed of a display information output source 130, a display information processing circuit 131, a power supply circuit 132, a timing generator 133, a liquid crystal device 134, and a drive circuit 136.

The display information output source 130 is comprised of a memory such as RAM (Random Access Memory) and the like, a storage unit such as various types of disks and the like, and a tuning circuit and the like that outputs a digital image signal. Based on various types of clock signals that are generated by the timing generator 133, display information such as a predetermined format image signal is provided to the display information processing circuit 131.

Next, the display information processing circuit 131 is comprised of a large number of well known circuits such as an amplifier/inverter circuit, a rotation circuit, a gamma correction circuit, and a clamp circuit, and the like, processes the display information input, and supplies an image signal together with a clock circuit CLK to a drive circuit 136. Here, the drive circuit 136 is both a scanning line drive circuit (not shown in the figures) and a data line drive circuit (not shown in the figures), and generally referred to as a test circuit. In addition, the power supply circuit 132 supplies a predetermined electric voltage to each of the aforementioned components.

The preferred embodiments of the present invention have been described above. However, the present invention is not limited to these embodiments, which can be modified in a variety of ways within the scope of the invention described in the claims.

For example, in the embodiments described above, the two orthogonal axes that define the convexities and the concavities that make up the reflecting pattern run parallel with the XX and YY directions that extend along the edges of the substrates in the liquid crystal device 1. However, the two axial directions that relate to the reflecting pattern and the edges of the substrates can be maintained at an appropriate angle.

In addition, the liquid crystal device 1 shown in FIG. 3 is merely an example. A liquid crystal device that can be applied to the substrate for a liquid crystal device according to the present invention can be one other than that shown in FIG. 3.

According to the substrate for a liquid crystal device, the method of producing these and a liquid crystal device, and an electronic apparatus according to the present invention, when light that is irradiated into the interior of the liquid crystal device is reflected by means of a light reflecting film, the light is not reflected uniformly throughout the entire space, but rather it is reflected such that the quantity or intensity of light in a certain viewing direction is increased. This prevents the reflected light from traveling to unnecessary viewing directions, and can increase the quantity of reflected light that moves to the desired viewing direction.

The entire disclosure of Japanese Patent Application No. 2000-392828 filed Dec. 25, 2000 and Japanese Patent Application No. 2001-347606 filed Nov. 13, 2001 is incorporated by reference herein.

What is claimed is:

1. A substrate for a liquid crystal device, comprising:
   a base; and
   a light reflecting film formed above said base,
   wherein said light reflecting film has a pattern that provides light directivity and light scattering,
   said pattern is formed by aligning at least one of a plurality of convexities and a plurality of concavities,
   said convexities or concavities are teardrop shape in plane section; and
   a spatial shape of said convexities or said concavities along one of two orthogonal axes that pass through said convexities or concavities is different from a spatial shape that extends along the other axis.

2. A liquid crystal display device comprising:
   a substrate for a liquid crystal device as set forth in claim 1; and
   a liquid crystal sandwiched between the pair of substrates.

3. An electronic apparatus comprising:
   a liquid crystal display device;
   a case accommodating said liquid crystal device,
   said liquid crystal device comprising:
   the liquid crystal display device as set forth in claim 2.

4. The substrate for a liquid crystal device according to claim 1, wherein said teardrop shape has a pointed end and a gently rounded end that are connected.

5. A substrate for a liquid crystal device, comprising:
   a base; and
   a light reflecting film formed above said base,
   wherein said light reflecting film has a pattern that provides light directivity and light scattering,
   said pattern is formed by aligning at least one of a plurality of convexities and a plurality of concavities,
   said convexities or concavities are teardrop shape in plane section, and
   one side of a spatial shape of said convexities or said concavities are bisected by at least one of the two orthogonal axes that pass through said convexities or concavities is asymmetric with the other side thereof.

6. The substrate for a liquid crystal device according to claim 5, wherein one side of a surface area of said spatial shape is asymmetric with the other side.

7. The substrate for a liquid crystal device according to claim 5, wherein one angle of said spatial shape with respect to said base is asymmetric with another angle of said spatial shape with respect to said base.

8. A liquid crystal display device comprising:
   a substrate for a liquid crystal device as set forth in claim 5; and
   a liquid crystal sandwiched between the pair of substrates.

9. The substrate for a liquid crystal device according to claim 5, wherein said teardrop shape has a pointed end and a gently rounded end that are connected.

10. A substrate for a liquid crystal device that is one of a pair of substrates sandwiching a liquid crystal and that is positioned opposite from a viewing-side substrate, comprising a base and a light reflecting film formed above said base, wherein at least one of a plurality of convexities and a plurality of concavities are formed and arranged in a reflecting pattern on said surface of said light reflecting film, said convexities or concavities are teardrop shape in plane section, and with respect to an amount of light reflected on said reflection pattern, a profile of the amount of light along one of two orthogonal axes that pass through said convexities or said concavities is different from the profile of the amount of light along the other of the two orthogonal axes.

11. The substrate for a liquid crystal device according to claim 10, wherein said profile of the amount of light along said one axis is peak shaped, and said profile of the amount of light along said other axis is a straight line.

12. A liquid crystal display device comprising:

a substrate for a liquid crystal device as set forth in claim 10; and a liquid crystal sandwiched between the pair of substrates.

13. The substrate for a liquid crystal device according to claim 10, wherein said teardrop shape has a pointed end and a gently rounded end that are connected.

14. A method of manufacturing a substrate for a liquid crystal device comprising the steps of:

forming an insulating layer on a surface of the base;

employing a mask to form at least one of a plurality of convexities and a plurality of concavities, said convexities or concavities are teardrop shape in plane section on the surface of said insulating layer; and forming a light reflecting film on the insulating layer;

wherein a shape of a mask pattern of said mask for said convexities or said concavities along one axis of two orthogonal axes that pass through said convexities or concavities is different from the shape that extends along the other axis.

15. A method for manufacturing a liquid crystal display device comprising the steps of:

manufacturing a substrate for a liquid crystal device as set forth in claim 14.

16. The method of manufacturing a substrate for a liquid crystal device according to claim 14, wherein said teardrop shape has a pointed end and a gently rounded that are connected.

17. A method of manufacturing a substrate for a liquid crystal device comprising the steps of:

forming an insulating layer on the surface of a base;

employing a mask to form at least one of a plurality of convexities and a plurality of concavities, said convexities or concavities are teardrop shape in plane section on a surface of said insulating layer; and forming a light reflecting film on said insulating layer;

wherein a shape of one side of a mask pattern of said mask for said plurality of convexities or said plurality of concavities that is bisected by at least one of two orthogonal axes that pass through said convexities or concavities is asymmetric with the other side thereof.

18. A method for manufacturing a liquid crystal display device comprising the steps of:

manufacturing a substrate for a liquid crystal device as set forth in claim 17.

19. The method of manufacturing a substrate for a liquid crystal device according to claim 17, wherein said teardrop shape has a pointed end and a gently rounded that are connected.

20. A substrate for a liquid crystal device that is one of a pair of substrates sandwiching a liquid crystal and that is positioned opposite from a viewing-side substrate, comprising a base and a light reflecting film formed above said base, wherein said light reflecting film has a pattern that is formed by aligning at least one of a plurality of convexities and a plurality of concavities, said convexities or concavities are teardrop shape in plane section, and with respect to an amount of light reflected on said reflection pattern, a profile of the amount of light along one of two orthogonal axes that pass through said convexities or said concavities is different from the profile of the amount of light along the other of the two orthogonal axes.

21. The substrate for a liquid crystal device according to claim 20, wherein said profile of the amount of light along said one axis is peak shaped, and said profile of the amount of light along said other axis is a straight line.

22. The substrate for a liquid crystal device according to claim 20, wherein said teardrop shape has a pointed end and a gently rounded end that are connected.

* * * * *